US00RE46083E

(19) United States
(12) Reissued Patent
Little et al.

(10) Patent Number: US RE46,083 E
(45) Date of Reissued Patent: Jul. 26, 2016

(54) SYSTEM AND METHOD FOR HANDLING DATA TRANSFERS

(71) Applicant: BlackBerry Limited, Waterloo (CA)

(72) Inventors: Herbert Anthony Little, Waterloo (CA); Neil Patrick Adams, Waterloo (CA); Michael Grant Kirkup, Waterloo (CA)

(73) Assignee: BlackBerry Limited, Waterloo, ON (CA)

(21) Appl. No.: 14/163,416

(22) Filed: Jan. 24, 2014

Related U.S. Patent Documents

Reissue of:

(64) Patent No.: 8,005,469
Issued: Aug. 23, 2011
Appl. No.: 12/795,252
Filed: Jun. 7, 2010

U.S. Applications:

(63) Continuation of application No. 13/490,956, filed on Jun. 7, 2012, now Pat. No. Re. 44,746, which is an application for the reissue of Pat. No. 8,005,469, which is a continuation of application No. 11/118,791, filed on Apr. 29, 2005, now Pat. No. 7,734,284.

(60) Provisional application No. 60/567,293, filed on Apr. 30, 2004.

(51) Int. Cl.

| | |
|---|---|
| ***H04M 3/00*** | (2006.01) |
| ***G06F 17/00*** | (2006.01) |
| ***H04L 29/06*** | (2006.01) |
| ***H04W 12/08*** | (2009.01) |
| ***H04M 7/00*** | (2006.01) |
| ***H04W 12/02*** | (2009.01) |
| *H04L 12/58* | (2006.01) |
| *H04M 3/20* | (2006.01) |

(52) U.S. Cl.
CPC ..... *H04L 63/04* (2013.01); *H04L 12/5855* (2013.01); *H04L 51/14* (2013.01); *H04L 63/105* (2013.01); *H04M 7/0078* (2013.01); *H04W 12/02* (2013.01); *H04W 12/08* (2013.01); *H04L 12/5895* (2013.01); *H04M 3/205* (2013.01); *H04M 2203/609* (2013.01)

(58) Field of Classification Search
None
See application file for complete search history.

(56) References Cited

U.S. PATENT DOCUMENTS

| | | | |
|---|---|---|---|
| 4,815,128 | A | 3/1989 | Malek |
| 4,837,812 | A | 6/1989 | Takahashi et al. |

(Continued)

FOREIGN PATENT DOCUMENTS

| | | |
|---|---|---|
| CA | 2505343 | 6/2010 |
| CN | 101253487 | 8/2008 |

(Continued)

OTHER PUBLICATIONS

Office Action issued in U.S. Appl. No. 13/529,509 on Mar. 25, 2014.

(Continued)

*Primary Examiner* — Minh Dieu Nguyen
(74) *Attorney, Agent, or Firm* — Fish & Richardson P.C.

(57) ABSTRACT

Systems and methods for managing data transfers between a secure location and a less secure location. A data transfer checker operating on a mobile device determines whether an attempted data transfer between two locations is permitted. If it is not permitted, then the data transfer is prevented and the user may be notified of the data transfer prevention.

15 Claims, 11 Drawing Sheets

(56) References Cited

U.S. PATENT DOCUMENTS 4,945,556 A 7/1990 Namekawa
4,972,457 A 11/1990 O'Sullivan
4,991,197 A 2/1991 Morris
5,220,604 A 6/1993 Gasser et al.
5,408,520 A 4/1995 Clark et al.
5,606,594 A 2/1997 Register et al.
5,774,551 A 6/1998 Wu et al.
5,802,483 A 9/1998 Morris
5,826,265 A 10/1998 Van Huben et al.
5,850,515 A 12/1998 Lo et al.
5,864,765 A 1/1999 Barvesten
5,987,440 A 11/1999 O'Neil et al.
5,987,611 A 11/1999 Freund
6,052,735 A 4/2000 Ulrich et al.
6,088,693 A 7/2000 Van Huben et al.
6,105,132 A 8/2000 Fritch et al.
6,125,447 A 9/2000 Gong
6,131,136 A 10/2000 Liebenow et al.
6,219,694 B1 4/2001 Lazaridis et al.
6,233,446 B1 5/2001 Do
6,243,756 B1 6/2001 Whitmire et al.
6,253,326 B1 6/2001 Lincke et al.
6,285,889 B1 9/2001 Nykanen et al.
6,292,798 B1 9/2001 Dockter et al.
6,343,313 B1 1/2002 Salesky et al.
6,351,816 B1 2/2002 Mueller et al.
6,360,322 B1 3/2002 Grawrock
6,405,202 B1 6/2002 Britton et al.
6,408,336 B1 * 6/2002 Schneider et al. ..... 709/229
6,412,070 B1 6/2002 Van Dyke et al.
6,490,289 B1 12/2002 Zhang et al.
6,516,421 B1 2/2003 Peters
6,546,554 B1 4/2003 Schmidt et al.
6,647,388 B2 11/2003 Numao et al.
6,668,323 B1 12/2003 Challener et al.
6,745,047 B1 6/2004 Karstens et al.
6,748,543 B1 6/2004 Vilhuber
6,757,821 B1 6/2004 Akiyama et al.
6,772,350 B1 8/2004 Belani et al.
6,775,536 B1 8/2004 Geiger et al.
6,785,810 B1 8/2004 Lirov et al.
6,795,688 B1 9/2004 Plasson et al.
6,795,967 B1 9/2004 Evans et al.
6,832,256 B1 * 12/2004 Toga ..... 709/229
6,886,038 B1 4/2005 Tabbara et al.
6,895,502 B1 5/2005 Fraser et al.
6,901,429 B2 5/2005 Dowling
6,957,330 B1 10/2005 Hughes
6,976,241 B2 12/2005 Cruz et al.
6,978,385 B1 12/2005 Cheston et al.
6,999,562 B2 2/2006 Winick
7,042,988 B2 5/2006 Juitt et al.
7,076,239 B2 7/2006 Kirkup et al.
7,076,797 B2 7/2006 Loveland
7,146,638 B2 12/2006 Malcolm
7,185,192 B1 * 2/2007 Kahn ..... 713/155
7,187,678 B2 3/2007 Cunetto et al.
7,246,374 B1 7/2007 Simon et al.
7,315,750 B2 1/2008 Chou et al.
7,330,712 B2 2/2008 Kirkup et al.
7,331,058 B1 2/2008 Gladney
7,400,878 B2 7/2008 Hassan et al.
7,469,417 B2 12/2008 Fearnley et al.
7,526,800 B2 4/2009 Wright et al.
7,574,200 B2 8/2009 Hassan et al.
7,603,466 B2 10/2009 Kilian-Kehr et al.
7,721,087 B1 5/2010 DiPasquo et al.
7,734,284 B2 6/2010 Adams et al.
7,751,331 B1 7/2010 Blair et al.
7,765,185 B2 7/2010 Rangadass
7,793,355 B2 9/2010 Little et al.
7,869,789 B2 1/2011 Hassan et al.
7,886,053 B1 2/2011 Newstadt et al.
7,890,627 B1 2/2011 Thomas
7,917,963 B2 3/2011 Goyal et al.
7,921,452 B2 4/2011 Ridlon et al.
8,005,469 B2 8/2011 Adams et al.
8,074,078 B2 12/2011 Brown et al.
8,208,900 B2 6/2012 Adler et al.
8,495,700 B2 7/2013 Shahbazi
8,495,731 B1 7/2013 Mar et al.
8,503,340 B1 8/2013 Xu
8,588,749 B1 11/2013 Sadhvani
8,656,016 B1 2/2014 Bender et al.
8,931,042 B1 1/2015 Weiss
2001/0047485 A1 11/2001 Brown et al.
2001/0056549 A1 12/2001 Pinault et al.
2002/0013815 A1 1/2002 Obradovich et al.
2002/0019944 A1 2/2002 Kou
2002/0029280 A1 * 3/2002 Holden et al. ..... 709/229
2002/0031230 A1 3/2002 Yu et al.
2002/0087880 A1 7/2002 Rhoades
2002/0095414 A1 7/2002 Barnett et al.
2002/0095497 A1 7/2002 Satagopan et al.
2002/0095571 A1 7/2002 Bradee
2002/0112155 A1 8/2002 Martherus et al.
2002/0184398 A1 12/2002 Orenshteyn
2003/0005317 A1 1/2003 Audebert et al.
2003/0014521 A1 1/2003 Elson et al.
2003/0026220 A1 2/2003 Uhlik et al.
2003/0031184 A1 2/2003 Cunetto et al.
2003/0035397 A1 2/2003 Haller et al.
2003/0054860 A1 3/2003 Chen
2003/0061087 A1 3/2003 Srimuang
2003/0065676 A1 4/2003 Gbadegesin et al.
2003/0070091 A1 4/2003 Loveland
2003/0087629 A1 5/2003 Juitt et al.
2003/0093698 A1 5/2003 Challener et al.
2003/0120948 A1 6/2003 Schmidt et al.
2003/0126437 A1 7/2003 Wheeler et al.
2003/0163685 A1 8/2003 Paatero
2003/0167405 A1 9/2003 Freund et al.
2003/0177389 A1 9/2003 Albert et al.
2003/0226015 A1 12/2003 Neufeld et al.
2003/0233410 A1 12/2003 Gusler
2003/0236983 A1 12/2003 Mihm, Jr.
2004/0001101 A1 1/2004 Trajkovic et al.
2004/0083382 A1 * 4/2004 Markham et al.
2004/0097217 A1 5/2004 McClain
2004/0100983 A1 * 5/2004 Suzuki
2004/0121802 A1 6/2004 Kim et al.
2004/0177073 A1 9/2004 Snyder et al.
2004/0209608 A1 * 10/2004 Kouznetsov et al.
2004/0215702 A1 10/2004 Hamasaki et al.
2004/0260710 A1 12/2004 Marston
2004/0268151 A1 * 12/2004 Matsuda ..... 713/201
2005/0022023 A1 * 1/2005 Chincheck et al. ..... 713/201
2005/0154935 A1 7/2005 Jin
2005/0164687 A1 * 7/2005 DiFazio
2005/0192008 A1 9/2005 Desai et al.
2005/0210270 A1 9/2005 Rohatgi et al.
2005/0213763 A1 9/2005 Owen et al.
2005/0245272 A1 * 11/2005 Spaur et al.
2006/0015621 A1 1/2006 Quinn
2006/0059556 A1 3/2006 Royer
2006/0070114 A1 3/2006 Wood et al.
2006/0090136 A1 4/2006 Miller et al.
2006/0120526 A1 6/2006 Boucher et al.
2006/0129848 A1 * 6/2006 Paksoy et al.
2006/0129948 A1 6/2006 Hamzy et al.
2006/0149846 A1 7/2006 Schuba
2006/0156026 A1 7/2006 Utin
2006/0168259 A1 7/2006 Spilotro et al.
2006/0168395 A1 7/2006 Deng et al.
2006/0206931 A1 9/2006 Dillaway et al.
2006/0212589 A1 9/2006 Hayer et al.
2006/0242685 A1 10/2006 Heard et al.
2006/0274750 A1 12/2006 Babbar et al.
2007/0019643 A1 1/2007 Sahheen
2007/0050854 A1 3/2007 Cooperstein et al.
2007/0073694 A1 3/2007 Picault et al.
2007/0156766 A1 7/2007 Hoang et al.
2007/0204153 A1 8/2007 Tome et al.
2007/0204166 A1 8/2007 Tome et al.

(56) References Cited

U.S. PATENT DOCUMENTS

| | | | |
|---|---|---|---|
| 2007/0254631 | A1 | 11/2007 | Spooner |
| 2007/0277127 | A1 | 11/2007 | Carlson et al. |
| 2008/0002726 | A1 | 1/2008 | Haung et al. |
| 2008/0028442 | A1 | 1/2008 | Kaza et al. |
| 2008/0081609 | A1 | 4/2008 | Burgan et al. |
| 2008/0098237 | A1 | 4/2008 | Dung et al. |
| 2008/0125146 | A1 | 5/2008 | Bainbridge |
| 2008/0130524 | A1 | 6/2008 | Volach et al. |
| 2008/0132202 | A1 | 6/2008 | Kirkup et al. |
| 2008/0134347 | A1 | 6/2008 | Goyal et al. |
| 2008/0137593 | A1 | 6/2008 | Laudermilch et al. |
| 2008/0184336 | A1 | 7/2008 | Sarukki et al. |
| 2008/0222711 | A1 | 9/2008 | Michaelis |
| 2008/0235041 | A1 | 9/2008 | Cashdollar et al. |
| 2008/0318616 | A1 | 12/2008 | Chipalkatti et al. |
| 2009/0031393 | A1 | 1/2009 | Denner |
| 2009/0068996 | A1 | 3/2009 | Bakker et al. |
| 2009/0070181 | A1 | 3/2009 | Loeffen |
| 2009/0094668 | A1 | 4/2009 | Corbin et al. |
| 2009/0178107 | A1 | 7/2009 | Karjoth et al. |
| 2009/0181662 | A1 | 7/2009 | Fleischman et al. |
| 2009/0254753 | A1 | 10/2009 | De Atley et al. |
| 2009/0260052 | A1 | 10/2009 | Bathula et al. |
| 2009/0300707 | A1 | 12/2009 | Garimella et al. |
| 2010/0024016 | A1 | 1/2010 | Violleau et al. |
| 2010/0024020 | A1 | 1/2010 | Baugher et al. |
| 2010/0081417 | A1 | 4/2010 | Hickie |
| 2010/0088753 | A1 | 4/2010 | Ayres et al. |
| 2010/0100825 | A1 | 4/2010 | Sharoni |
| 2010/0107215 | A1 | 4/2010 | Bechtel et al. |
| 2010/0153969 | A1 | 6/2010 | Dyba et al. |
| 2010/0175104 | A1 | 7/2010 | Khalid |
| 2010/0184440 | A1 | 7/2010 | Mao et al. |
| 2010/0222097 | A1 | 9/2010 | Gisby et al. |
| 2010/0242086 | A1 | 9/2010 | Adams et al. |
| 2010/0274910 | A1 | 10/2010 | Ghanaie-Sichanie et al. |
| 2010/0278162 | A1 | 11/2010 | Groux et al. |
| 2010/0281487 | A1 | 11/2010 | Schneider et al. |
| 2010/0299376 | A1 | 11/2010 | Batchu et al. |
| 2010/0299394 | A1 | 11/2010 | Jania et al. |
| 2010/0299719 | A1 | 11/2010 | Burks et al. |
| 2010/0319053 | A1 | 12/2010 | Gharabally |
| 2010/0325221 | A1 | 12/2010 | Cohen et al. |
| 2010/0325430 | A1 | 12/2010 | Denninghoff |
| 2010/0325710 | A1 | 12/2010 | Etchegoyen |
| 2011/0010699 | A1 | 1/2011 | Cooper et al. |
| 2011/0082808 | A1 | 4/2011 | Beykpour et al. |
| 2011/0099605 | A1 | 4/2011 | Cha et al. |
| 2011/0126214 | A1 | 5/2011 | O'Farrell et al. |
| 2011/0145833 | A1 | 6/2011 | De Los Reyes et al. |
| 2011/0179083 | A1 | 7/2011 | Galloway et al. |
| 2011/0195698 | A1 | 8/2011 | Pearce |
| 2011/0210171 | A1 | 9/2011 | Brown et al. |
| 2011/0246753 | A1 | 10/2011 | Thomas |
| 2011/0252240 | A1 | 10/2011 | Freedman et al. |
| 2011/0270963 | A1 | 11/2011 | Saito et al. |
| 2011/0314467 | A1 | 12/2011 | Pearson |
| 2012/0005477 | A1 | 1/2012 | Wei et al. |
| 2012/0005723 | A1 | 1/2012 | Chaturvedi et al. |
| 2012/0005745 | A1 | 1/2012 | Wei et al. |
| 2012/0023573 | A1 | 1/2012 | Shi |
| 2012/0054853 | A1 | 3/2012 | Gupta et al. |
| 2012/0079110 | A1 | 3/2012 | Brown et al. |
| 2012/0079586 | A1 | 3/2012 | Brown et al. |
| 2012/0079609 | A1 | 3/2012 | Bender et al. |
| 2012/0084184 | A1 | 4/2012 | Raleigh et al. |
| 2012/0109826 | A1 | 5/2012 | Kobres |
| 2012/0131685 | A1 | 5/2012 | Broch et al. |
| 2012/0144196 | A1 | 6/2012 | Owen et al. |
| 2012/0157165 | A1 | 6/2012 | Kim et al. |
| 2012/0157166 | A1 | 6/2012 | Kim et al. |
| 2012/0202527 | A1 | 8/2012 | Obradovich et al. |
| 2012/0210443 | A1 | 8/2012 | Blaisdell et al. |
| 2012/0214442 | A1 | 8/2012 | Crawford et al. |
| 2012/0214503 | A1 | 8/2012 | Liu et al. |
| 2012/0278863 | A1 | 11/2012 | Wallace et al. |
| 2012/0278904 | A1 | 11/2012 | Perez et al. |
| 2012/0291140 | A1 | 11/2012 | Robert et al. |
| 2012/0304280 | A1 | 11/2012 | Hayashida |
| 2012/0309344 | A1 | 12/2012 | Ferrazzini et al. |
| 2012/0324067 | A1 | 12/2012 | Hari et al. |
| 2013/0074142 | A1 | 3/2013 | Brennan et al. |
| 2013/0097316 | A1 | 4/2013 | Bender et al. |
| 2013/0097657 | A1 | 4/2013 | Cardamore et al. |
| 2013/0124583 | A1 | 5/2013 | Ferguson et al. |
| 2013/0174222 | A1 | 7/2013 | Ogle |
| 2013/0219465 | A1 | 8/2013 | Tse et al. |
| 2013/0346606 | A1 | 12/2013 | Ryerson et al. |

FOREIGN PATENT DOCUMENTS

| | | | |
|---|---|---|---|
| CN | 101523878 | | 9/2009 |
| EP | 332558 | | 9/1989 |
| EP | 605106 | | 7/1994 |
| EP | 973350 | | 1/2000 |
| EP | 1168141 | | 1/2002 |
| EP | 1471691 | | 10/2004 |
| EP | 1596410 | | 11/2005 |
| EP | 1624428 | | 2/2006 |
| EP | 1806674 | | 7/2007 |
| EP | 1563663 | | 10/2008 |
| EP | 2337300 | | 6/2011 |
| GB | 2378780 | | 2/2003 |
| GB | 2408179 | | 5/2005 |
| GB | 2440015 | | 1/2008 |
| JP | 2000-253241 | | 9/2000 |
| JP | 2001-077811 | | 3/2001 |
| JP | 2001-203761 | * | 7/2001 |
| JP | 2002-288087 | * | 10/2002 |
| WO | 96/25828 | | 8/1996 |
| WO | 99/05814 | * | 2/1999 |
| WO | 00/59225 | | 10/2000 |
| WO | 00/60434 | | 10/2000 |
| WO | 2004/017592 | | 2/2004 |
| WO | 2004/043031 | | 5/2004 |
| WO | 2005/045550 | | 5/2005 |
| WO | 2005/062279 | | 7/2005 |
| WO | 2006/130807 | | 12/2006 |
| WO | 2007048251 | | 5/2007 |
| WO | 2009/012329 | | 1/2009 |
| WO | 2009/014975 | | 1/2009 |
| WO | 2009/021200 | | 2/2009 |
| WO | 2012/037656 | | 3/2012 |
| WO | 2012/037657 | | 3/2012 |
| WO | 2012037658 | | 3/2012 |
| WO | 2012/109497 | | 8/2012 |

OTHER PUBLICATIONS

International Preliminary Report on Patentability under Ch. II issued in International Application No. PCT/CA2012/050796 on Mar. 10, 2014; 18 pages.

Office Action issued in U.S. Appl. No. 13/293,743 on Jul. 16, 2014.

Office Action issued in U.S. Appl. No. 13/274,913 on Jul. 1, 2014.

Office Action issued in U.S. Appl. No. 13/25,097 on Jul. 16, 2014.

Office Action issued in U.S. Appl. No. 13/659,561 on Jul. 2, 2014.

Extended European Search Report mailed Mar. 17, 2014 in European Application No. 11162178.5.

Office Action issued in Chinese Application No. 201110308441.4 on Jul. 8, 2014; 4 pages. No translation.

Communication Pursuant to Article 94(3) EPC issued in European Application No. 11186796.6 on Aug. 29, 2014; 5 pages.

Office Action issued in Canadian Application No. 2,792,772 on Sep. 5, 2014; 3 pages.

Office Action issued in Canadian Application No. 2,792,707 on Sep. 8, 2014; 3 pages.

Office Action issued in U.S. Appl. No. 13/296,963 on Oct. 3, 2014.

Notice of Acceptance issued in Australian Application No. 2012203391 on Jul. 25, 2014; 2 pages.

Communication pursuant to Article 94(3) issued in EP Application No. 11186802.2 on Aug. 25, 2014.

(56) References Cited

OTHER PUBLICATIONS

International Preliminary Report on Patentability under Chapter II issued in International Application No. PCT/CA2012/050797 on Feb. 12, 2014; 13 pages.
IETF RFC 3530; "Network File System (NFS) Version 4 Protocol"; Apr. 2003.
"Secure Inter-Process Communication"; Apr. 4, 2004. Retrieved from internet on Jan. 20, 2014 https://web.archive.org/web/20040404015137/http://cr.yp.to/docs/secureipc.html.
Notice of Allowance issued in Canadian Application No. 2,769,646 on Feb. 15, 2013; 1 page.
Office Action issued in Canadian Application No. 2,564,914 on Dec. 3, 2013; 2 pages.
Notice of Allowance. Canadian Application No. 2,505,343. Dated: Sep. 15, 2009.
Examiner's First Report issued in Australian Application No. 2012203391 on Jan. 22, 2014; 4 pages.
Office Action issued in Chinese Application No. 201110308441.4 on Oct. 25, 2013; 9 pages.
Office Action issued in U.S. Appl. No. 13/274,913 on Dec. 5, 2014.
Office Action issued in Canadian Application No. 2,820,687 on Nov. 3, 2014; 3 pages.
Office Action issued in U.S. Appl. No. 13/659,561 on Dec. 10, 2014.
XP002167366; Chen, Zhijun; "Java Card Technology for Smart Cards: Architecture and Programmer's Guide"; "Applet Firewall and Object Sharing;" Internet citation; Jun. 2, 2000; <http://developer.java.sun.com/developer/Books/consumerproducts/javacard/ch09.pdf>.
Google Inc.; Android 2.3.4 User's Guide; May 20 2011; 384 pages.
Microsoft Corp.; Microsoft Outlook 2010; Released Jul. 15, 2010; 27 pages.
Microsoft Office: Microsoft Outlook 2010 Product Guide; Microsoft Corp. 2010; published in 2010; 65 pages.
Windows 7 Product Guide; Microsoft Corp. 2009; published in 2009; 140 pages.
Research in Motion, "BlackBerry Bridge App 2.1 and Blackberry PlayBook Tablet 2.1, Security Technical Overview"; Version: 2.1; Jul. 17, 2012; 43 pages.
Research in Motion, "BlackBerry Device Service 6.1 and BlackBerry PlayBook Tablet 2.1, Security Technical Overview"; Version: 6.1; Sep. 17, 2012; 90 pages.
View messages with restricted permission sent by using IRM; Support/Outlook/Outlook 2007 Help and How-to. http://office.mircosoft.com/en-us/outlook-help/view-messages-with-restricted-permission-sent-by-using-irm-HA010246115.as . . . , pp. 1-2, retrieved on Feb. 12, 2010.
Send an e-mail message with restricted permission by using IRM; Support/Outlook/Outlook 2007 Help and How to. http://office.mircosoft.com/en-us/outlook-help/send-an-e-mail-message-with-restricted-permission-by-using-irm-HA01024780 . . . , pp. 1-4, retrieved on Feb. 12, 2010.
Introduction to using IRM for e-mail messages; Support/Outlook/Outlook 2007 Help and How-to. http://office.microsoft.com/en-us/outlook-help/introduction-to-using-irm-for-e-mail-message-HA010100366.aspx?CTT=5&or . . . , pp. 1-6, retrieved on Feb. 12, 2010.
Red Hat: "Red Hat Linux 7.2—The Official Red Had Linux Reference Guide" Red Hat Linux Manuals, Online!, Oct. 22, 2001, XP002276029, pp. 145-155.
Sygate: "Sygate Personal Firewall PRO User Guide" Sygate Personal Firewall Pro User Guide version 2.0; 2001, pp. 1-77, XP002248366.
"A Technical Overview of the Lucent VPN Firewall" White Paper Lucent Technologies, XX, XX, Aug. 2002, pp. 1-35, XP002271173, Chapter 1.
"Customizing User Interaction in Smart Phones", Pervasive Computing, IEEE CS (2006) pp. 81-90 (URL: http://www.idi. ntnu.no/grupperlsu/bibliography/pdf/2006/Korpipaa2006pc.pdf).
"Supporting Mobile Privacy and Security through Sensor-Based Context Detection", Julian Seifert, Second International Workshop on Security and Privacy in Spontaneous Interaction and Mobile Phone Use, May 17, 2010, Finland (URL: http://www.medien.ifi.lmu.de/iwssi2010/papers/iwssi-spmu2010-seifert.pdf).
EagleVision: A Pervasive Mobile Device Protection System, Ka Yang, Nalin Subramanian, Daji Qiao, and Wen sheng Zhang, Iowa State University (URL: http://www.cs.iastate.edu/-wzhang/papers/eagleVision.pdf) Jul. 13-16, 2009.
"Using context-profiling to aid access control decisions in mobile devices", Gupta et al., Nokia Research Center (URL: http://www.cerias.purdue.edu/assets/symposium/2011-posters1372-C48.pdf) Please refer to the I-page file named 372-C48.pdf; 2011.
Smartphone Security Beyond Lock and Wipe (Jun. 10, 2010): http://www.enterprisemobiletoday.com/article. php/3887006.
Basic Access Authentication (Jan. 23, 2010): http://en.wikipedia.org/wiki/Basic_access_authentication.
Digital Access Authentication (Dec. 23, 2009): http://en.wikipedia.org/wiki/Digest_access_authentication.
Cross-site request forgery (Nov. 30, 2008): http://en.wikipedia.org/wiki/Cross-site_request_forgery.
Office Action issued in U.S. Appl. No. 11/118,791 on Sep. 25, 2006; 11 pages.
Office Action issued in U.S. Appl. No. 11/118,791 on Nov. 28, 2007; 12 pages.
Office Action issued in U.S. Appl. No. 11/118,791 on Mar. 30, 2007; 12 pages.
Office Action issued in U.S. Appl. No. 11/118,791 on May 20, 2008; 13 pages.
Office Action issued in U.S. Appl. No. 11/118,791 on Jan. 27, 2009; 16 pages.
Office Action issued in U.S. Appl. No. 11/118,791 on Apr. 8, 2009; 14 pages.
Advisory Action issued in U.S. Appl. No. 11/118,791 on Jun. 26, 2009; 8 pages.
Notice of Allowance issued in U.S. Appl. No. 11/118,791 on Jan. 20, 2010; 4 pages.
Office Action issued in U.S. Appl. No. 12/795,252 on Aug. 6, 2010; 6 pages.
Notice of Allowance issued in U.S. Appl. No. 12/795,252 on Dec. 17, 2010; 4 pages.
Notice of Allowance issued in U.S. Appl. No. 12/795,252 on Apr. 14, 2011; 4 pages.
Notice of Allowance issued in U.S. Appl. No. 13/490,956 on Dec. 4, 2013; 8 pages.
Office Action issued in U.S. Appl. No. 13/296,963 on Nov. 18, 2013; 23 pages.
Ferguson et al., U.S. Appl. No. 13/293,743, "Managing Cross Perimeter Access," filed Nov. 10, 2011.
Office Action issued in U.S. Appl. No. 13/293,743 on Feb. 14, 2013; 15 pages.
Office Action issued in U.S. Appl. No. 13/293,743 on Sep. 20, 2013; 19 pages.
Advisory Action issued in U.S. Appl. No. 13/293,743 on Nov. 26, 2013; 3 pages.
Office Action issued in U.S. Appl. No. 13/398,676 on Sep. 5, 2012; 21 pages.
Notice of Allowance issued in U.S. Appl. No. 13/398,676 on Nov. 7, 2013; 22 pages.
Office Action issued in U.S. Appl. No. 13/274,913 on Jan. 23, 2013; 22 pages.
Office Action issued in U.S. Appl. No. 13/274,913 on Jul. 16, 2013.
Office Action issued in U.S. Appl. No. 13/274,913 on Jan. 2, 2014.
Office Action issued in U.S. Appl. No. 13/25,097 on Feb. 28, 2013; 18 pages.
Advisory Action issued in U.S. Appl. No. 13/275,097 on Dec. 6, 2013; 4 pages.
Office Action issued in U.S. Appl. No. 13/25,097 on Sep. 10, 2013; 21 pages.
Office Action issued in U.S. Appl. No. 13/659,527 on May 23, 2013; 8 pages.
Notice of Allowance issued in U.S. Appl. No. 13/659,527 on Oct. 7, 2013; 15 pages.
Office Action issued in U.S. Appl. No. 13/722,213 on May 22, 2013; 8 pages.

(56) References Cited

OTHER PUBLICATIONS

Office Action issued in U.S. Appl. No. 13/722,213 on Dec. 4, 2013; 6 pages.
Notice of Allowance issued in U.S. Appl. No. 13/722,213 on Jan. 29, 2014; 7 pages.
Office Action issued in U.S. Application No. 10/524,353 on Sep. 21, 2012; 16 pages.
Office Action issued in U.S. Appl. No. 13/098,456 on Sep. 13, 2012; 20 pages.
Office Action issued in U.S. Appl. No. 13/098,456 on Apr. 17, 2013; 31 pages.
Office Action issued in U.S. Appl. No. 13/098,456 on Sep. 27, 2013; 28 pages.
Owen, Russell N., U.S. Appl. No. 13/371,093, filed Feb 10, 2012; Title: System and Method for Secure Control of Resources of Wireless Mobile Communication Device.
Owen, Russell N., U.S. Appl. No. 10/524,353, filed Aug. 19, 2003; Title: System and Method for Secure Control of Resources of Wireless Mobile Communication Devices.
Office Action issued in U.S. Appl. No. 10/524,353 on Sep. 21, 2012.
Owen, Russell N., U.S. Appl. No. 10/524,353, filed Feb. 14, 2005; Title: System and Method for Secure Control of Resources of Wireless Mobile Communication Device.
Bender, Christopher Lyle; U.S. Appl. No. 13/074,136, filed Mar. 29, 2011; Title: Data Source Based Application Sandboxing.
Extended European Search Report issued in European Application No. 11188696.6 on Apr. 12, 2012; 7 pages.
Communication Pursuant to Article 94(3) EPC issued in European Application No. 11188696.6 on Jul. 9, 2013; 4 pages.
Extended European Search Report issued in European Application No. 11186802.2 on Jan. 18, 2012; 7 pages.
Extended European Search Report issued in European Application No. 11186796.6 on Jan. 18, 2012; 8 pages.
Extended European Search Report issued in European Application No. 12173030.3 on Nov. 22, 2012; 6 pages.
Extended European Search Report issued in European Application No. 12189773.0 on Mar. 7, 2013; 8 pages.
Extended European Search Report issued in European Application No. 12189805.0 on Apr. 16, 2013; 6 pages.
European Supplementary Search Report issued in European Application No. 05738877.9 on Sep. 13, 2007; 3 pages.
Communication Pursuant to Article 94(3) EPC issued in European Application No. 05738877.9 on Jan. 15, 2008; 4 pages.
Communication Pursuant to Article 94(3) Epc issued in European Application No. 05738877.9 on Jul. 15, 2009; 4 pages.
Communication under Rule 71(3) EPC issued in European Application No. 05738877.9 on Sep. 17, 2010; 41 pages.
EP Application No. 12155659.1, Extended European Search Report dated Jan. 8, 2012.
Extended European Search Report mailed Jul. 13, 2012, in corresponding European patent application No. 12153439.0.
European Search Report of Appln. No. 04256690.1-2412, date of mailing Apr. 6, 2005—9 pgs.
International Search Report and Written Opinion of the International Searching Authority issued in International Application No. PCT/CA2012/050796 on Feb. 21, 2013; 13 pages.
International Search Report and Written Opinion issued in International Application No. PCT/CA2011/001058 on Dec. 21, 2011; 9 pages.
International Search Report and Written Opinion issued in International Application No. PCT/CA2012/050797 on Feb. 5, 2013; 8 pages.
International Search Report and Written Opinion of the International Searching Authority issued in International Application No. PCT/CA2011/050707 on Jan. 18, 2012; 7 pages.
International Preliminary Report on Patentability issued in International Application No. PCT/CA2011/050707 on May 30, 2013; 4 pages.
International Search Report issued in International Application No. PCT/CA2005/000652 on Aug. 17, 2005; 9 pages.
International Preliminary Report on Patentability under Chapter I issued in International Application No. PCT/CA2005/000652 on Nov. 9, 2006; 6 pages.
International Application No. PCT/CA 03101245, International Search Report dated Dec. 23, 2003.
International Application No. PCT/CA 03101245, PCT Written Opinion, dated Apr. 23, 2004.
International Application No. PCT/CA 03101245, PCT Written Opinion, dated Sep. 20, 2004.
International Application No. PCT/CA 03101245, PCT International Preliminary Examination Report, dated Nov. 29, 2004.
Int'l Search Report and the Written Opinion of the Int'l Searching Authority, or the Declaration of Appln. Serial No. PCT/CA2004/000250 of Feb. 20, 2004—12 pgs.
International Search Report issued in International Application No. PCT/CA03/01679 on May 6, 2004—6 pgs.
Office Action issued in Canadian Application No. 2,769,646 on Jun. 5, 2012; 3 pages.
Office Action issued in Canadian Application No. 2,769,646 on Oct. 22, 2012; 2 pages.
Office Action issued in Canadian Application No. 2,564,914 on May 3, 2010; 4 pages.
Office Action issued in Canadian Application No. 2,564,914 on Apr. 4, 2011; 2 pages.
Examiner's First Report issued in Australian Application No. 2005239005 on Oct. 15, 2007; 2 pages.
Examiner's Report No. 2 issued in Australian Application No. 2005239005 on Jul. 15, 2009; 2 pages.
Examiner's First Report issued in Australian Application No. 2009202857 on Nov. 5, 2010; 3 pages.
First Office Action issued in Chinese Application No. 200580013730.4 on Mar. 27, 2009; 9 pages.
Second Office Action issued in Chinese Application No. 200580013730.4 on Dec. 12, 2010; 10 pages.
Third Office Action issued in Chinese Application No. 200580013730.4 on Mar. 8, 2011; 10 pages.
Notice of Allowance issued in Chinese Application No. 200580013730.4 on Jul. 28, 2011; 4 pages.
Fourth Office Action. Chinese Application No. 200380105435.2. Dated: Aug. 3, 2011.
First Examination Report issued in Indian Application No. 6068/DELNP/2006 on Jun. 3, 2010; 2 pages.
Patent Certificate. Indian Patent Application No. 1956/DELNP/2005. Dated: Oct. 31, 2003.
Notice of Reasons for Rejection issued in Japanese Application No. 2007-509840 on Jun. 15, 2009; 5 pages.
Notice of Allowance issued in Japanese Application No. 2007-509840 on Jan. 25, 2010; 3 pages.
Notice Requesting Submission of Opinion issued in Korean Application No. 10-2006-7025081 on Nov. 16, 2007; 10 pages.
Notice of Decision of Final Rejection issued Korean Application No. 10-2006-7025081 on Jun. 18, 2008.
Trial Decision issued in Korean Application No. 10-2006-7025081 on Jul. 27, 2009; 10 pages.
Notice of Decision for Patent issued in Korean Application No. 10-2006-7025081 on Aug. 7, 2009; 3 pages.
Certificate of Grant of Patent. Singapore Patent No. 112419. Dated: Apr. 30, 2007.
Certificate of Grant of Patent. Hong Kong Patent No. 1080315. Dated: Apr. 24, 2009.
Boyce, "Microsoft Outlook 2010 Inside Out," XP055196121, Microsoft Press, Aug. 15, 2010, 152 pages.
Extended European Search Report in European Application No. 12847536.5, dated Jun. 29, 2015, 8 pages.
United States Office Action in U.S. Appl. No. 13/25,097, dated Feb. 24, 2015, 22 pages.
United States Office Action in U.S. Appl. No. 13/801,437, dated Mar. 2, 2015, 53 pages.
European Communication Pursuant to Article 94(3) EPC in European Application No. 12189773.0, dated Feb. 5, 2015, 6 pages.
Chinese Office Action in Chinese Application No. 201110308441.4, dated Jan. 20, 2015, 5 pages.

(56) References Cited

OTHER PUBLICATIONS

United States Office Action in U.S. Appl. No. 13/293,743, dated Apr. 8, 2015, 15 pages.
United States Office Action in U.S. Appl. No. 13/529,509, dated Apr. 8, 2015, 13 pages.
Saha Saurabh, "Auto-Open Certain Websites in Google Chrome Incognito Private Mode", Dec. 31; 2012, <http://web.archive.org/web/20121231021254/http://www.techgyd/com/auto-open-sites-in-google-incognito/360>, 5 pages.
Extended European Search Report issued in European Appiication No. 13165229.9 on Nov. 10, 2015.
Japanese Notice of Reasons for Rejection mailed on Jun. 15, 2009 for Japanese Patent Application No. 2007-509840.
Singh, Anish, Australian Patent Office, Australian Application No. 20090202857, filed Apr. 29, 2005, in Examiner's First Report, mailed Nov. 5, 2010, 3 pages.

* cited by examiner

SYSTEM AND METHOD FOR HANDLING DATA TRANSFERS

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

*This application is a continuation reissue application of reissue application Ser. No. 13/490,956, filed on Jun. 7, 2012, and is a reissue of U.S. Pat. No. 8,005,469.*

CROSS-REFERENCE TO RELATED APPLICATIONS

This application is a continuation of the U.S. patent application Ser. No. 11/118,791, filed Apr. 29, 2005, entitled "SYSTEM AND METHOD FOR HANDLING DATA TRANSFERS." This application and the '791 application claim priority to and the benefit of commonly assigned U.S. Provisional Application having Ser. No. 60/567,293, filed on Apr. 30, 2004, entitled "SYSTEM AND METHOD FOR HANDLING DATA TRANSFERS." All of these are hereby incorporated into this application by reference.

BACKGROUND

1. Technical Field

This document relates generally to the field of communications, and in particular to handling data transfers that involve mobile wireless communications devices.

2. Description of the Related Art

Some companies or governments have different types of networks based on different levels of security. Some of the networks are more secure than others and provide additional levels of security, as well as different procedures for using that network. It is a security concern for data to move between the networks, specifically from a more secure network to a weaker network. An additional problem is how to prevent a malicious application from siphoning data from inside a corporation's firewall to outside the firewall.

For example the government may have a secret network and a non-secret network. The workstations on the secret network may not even be connected to the non-secret network to explicitly prevent data siphoning. To prevent data siphoning between these networks for mobile communications, the government would have to deploy two separate PDAs to each employee that uses both of the networks. This is a costly approach.

As another example, an organization may wish to deploy handhelds to employees, which connect to their corporate network as well as their personal (home) email accounts. It would be detrimental for an employee to siphon data between their corporate secure network to their personal accounts.

DETAILED DESCRIPTION OF THE DRAWINGS

Figure 1:
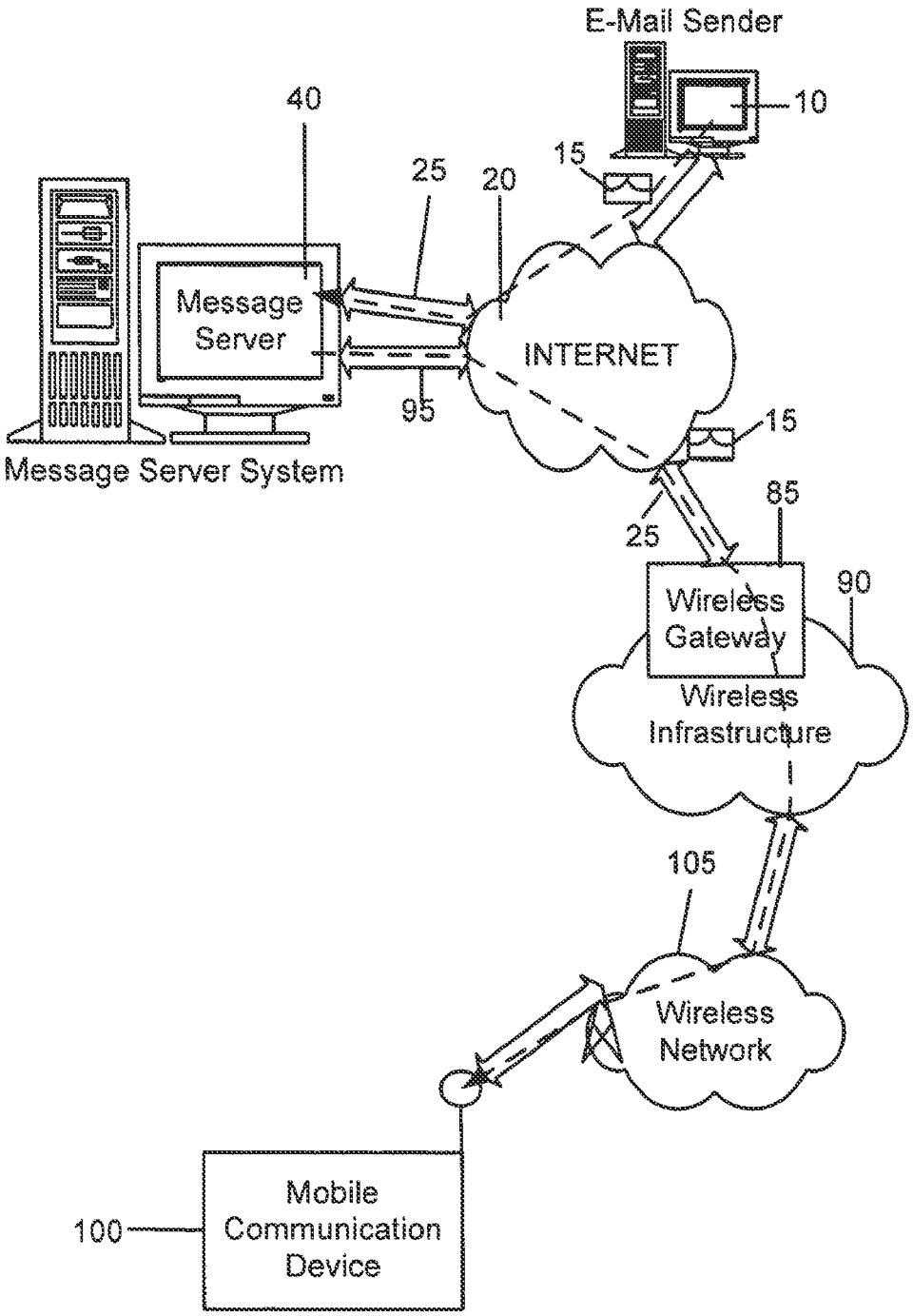
FIG. 1 is an overview of an example communication system in which a wireless communication device may be used.

FIG. 1 is an overview of an example communication system in which a wireless communication device may be used. One skilled in the art will appreciate that there may be many different topologies, but the system shown in FIG. 1 helps demonstrate the operation of the encoded message processing systems and methods described in the present application. There may also be many message senders and recipients. The simple system shown in FIG. 1 is for illustrative purposes only, and shows perhaps the most prevalent Internet e-mail environment where security is not generally used.

FIG. 1 shows an e-mail sender 10, the Internet 20, a message server system 40, a wireless gateway 85, wireless infrastructure 90, a wireless network 105 and a mobile communication device 100.

An e-mail sender system 10 may, for example, be connected to an ISP (Internet Service Provider) on which a user of the system 10 has an account, located within a company, possibly connected to a local area network (LAN), and connected to the Internet 20, or connected to the Internet 20 through a large ASP (application service provider) such as America Online (AOL). Those skilled in the art will appreciate that the systems shown in FIG. 1 may instead be connected to a wide area network (WAN) other than the Internet, although e-mail transfers are commonly accomplished through Internet-connected arrangements as shown in FIG. 1.

The message server 40 may be implemented, for example, on a network computer within the firewall of a corporation, a computer within an ISP or ASP system or the like, and acts as the main interface for e-mail exchange over the Internet 20. Although other messaging systems might not require a message server system 40, a mobile device 100 configured for receiving and possibly sending e-mail will normally be associated with an account on a message server. Perhaps the two most common message servers are Microsoft Exchange™ and Lotus Domino™. These products are often used in conjunction with Internet mail routers that route and deliver mail. These intermediate components are not shown in FIG. 1, as they do not directly play a role in the secure message processing described below. Message servers such as server 40 typically extend beyond just e-mail sending and receiving; they also include dynamic database storage engines that have predefined database formats for data like calendars, to-do lists, task lists, e-mail and documentation.

The wireless gateway 85 and infrastructure 90 provide a link between the Internet 20 and wireless network 105. The wireless infrastructure 90 determines the most likely network for locating a given user and tracks the user as they roam between countries or networks. A message is then delivered to the mobile device 100 via wireless transmission, typically at a radio frequency (RF), from a base station in the wireless network 105 to the mobile device 100. the particular network 105 may be virtually any wireless network over which messages may be exchanged with a mobile communication device.

As shown in FIG. 1, a composed e-mail message 15 is sent by the e-mail sender 10, located somewhere on the Internet 20. This message 15 is normally fully in the clear and uses traditional Simple Mail Transfer Protocol (SMTP), RFC822 headers and Multipurpose Internet Mail Extension (MIME) body parts to define the format of the mail message. These techniques are all well known to those skilled in the art. The message 15 arrives at the message server 40 and is normally stored in a message store. Most known messaging systems support a so-called "pull" message access scheme, wherein the mobile device 100 must request that stored messages be forwarded by the message server to the mobile device 100. Some systems provide for automatic routing of such messages which are addressed using a specific e-mail address associated with the mobile device 100. In a preferred embodiment described in further detail below, messages addressed to a message server account associated with a host system such as a home computer or office computer which belongs to the user of a mobile device 100 are redirected from the message server 40 to the mobile device 100 as they are received.

Regardless of the specific mechanism controlling the forwarding of messages to the mobile device 100, the message 15, or possibly a translated or reformatted version thereof, is sent to the wireless gateway 85. The wireless infrastructure 90 includes a series of connections to wireless network 105. These connections could be Integrated Services Digital Network (ISDN), Frame Relay or T1 connections using the TCP/IP protocol used throughout the Internet. As used herein, the term "wireless network" is intended to include three different types of networks, those being (1) data-centric wireless networks, (2) voice-centric wireless networks and (3) dual-mode networks that can support both voice and data communications over the same physical base stations. Combined dual-mode networks include, but are not limited to, (1) Code Division Multiple Access (CDMA) networks, (2) the Groupe Special Mobile or the Global System for Mobile Communications (GSM) and the General Packet Radio Service (GPRS) networks, and (3) future third-generation (3G) networks like Enhanced Data-rates for Global Evolution (EDGE) and Universal Mobile Telecommunications Systems (UMTS). Some older examples of data-centric network include the Mobitex™ Radio Network and the DataTAC™ Radio Network. Examples of older voice-centric data networks include Personal Communication Systems (PCS) networks like GSM, and TDMA systems.

Figure 2:
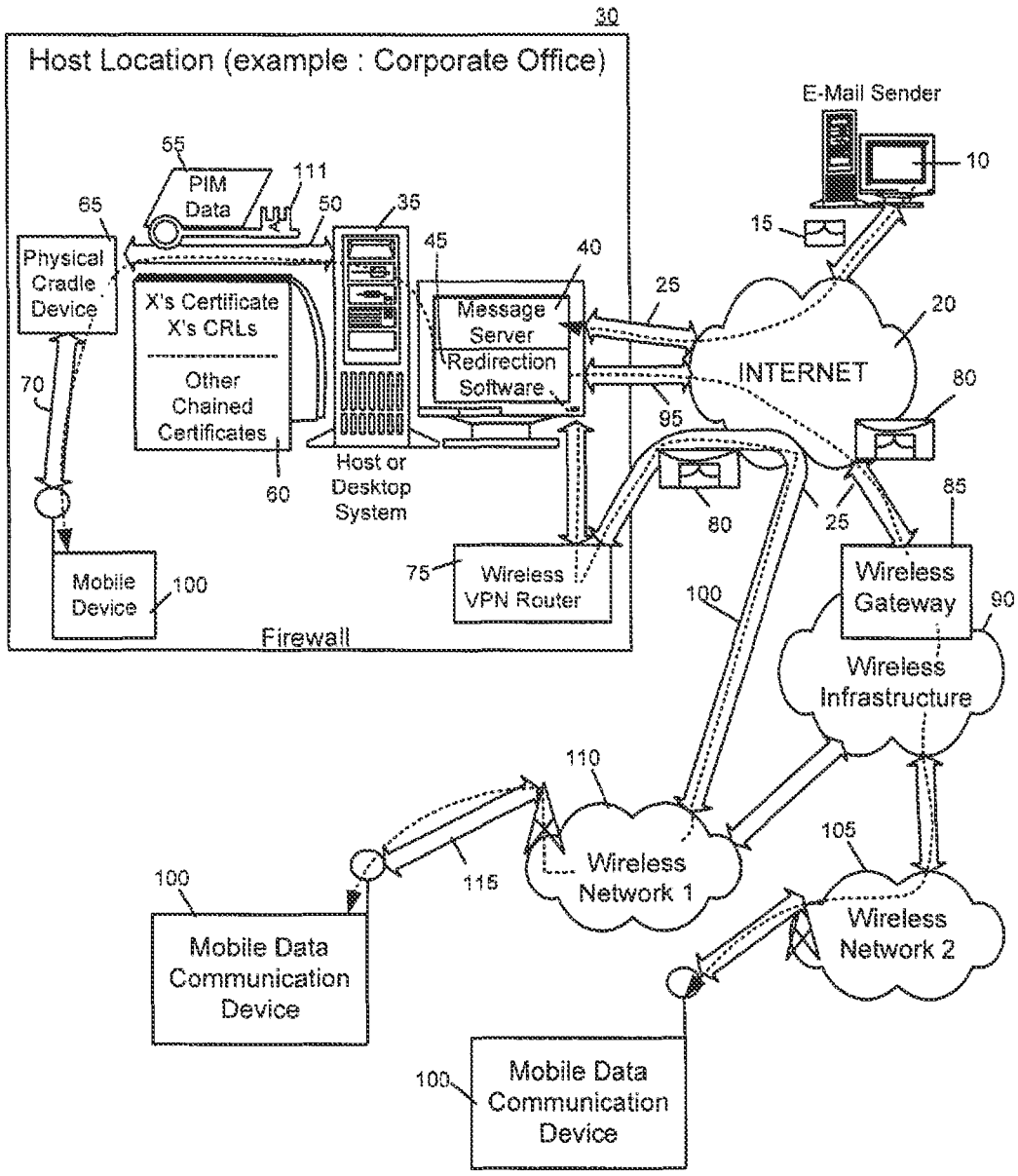
FIG. 2 is a block diagram of a further example communication system including multiple networks and multiple mobile communication devices.

FIG. 2 is a block diagram of a further example communication system including multiple networks and multiple mobile communication devices. The system of FIG. 2 is substantially similar to the FIG. 1 system, but includes a host system 30, a redirection program 45, a mobile device cradle 65, a wireless virtual private network (VPN) router 75, an additional wireless network 110 and multiple mobile communication devices 100. As described above in conjunction with FIG. 1, FIG. 2 represents an overview of a sample network topology. Although the encoded message processing systems and methods described herein may be applied to networks having many different topologies, the network of FIG. 2 is useful in understanding an automatic e-mail redirection system mentioned briefly above.

The central host system 30 will typically be a corporate office or other LAN, but may instead be a home office computer or some other private system where mail messages are being exchanged. Within the host system 30 is the message server 40, running on some computer within the firewall of the host system, that acts as the main interface for the host system to exchange e-mail with the Internet 20. In the system of FIG. 2, the redirection program 45 enables redirection of data items from the server 40 to a mobile communication device 100. Although the redirection program 45 is shown to reside on the same machine as the message server 40 for ease of presentation, there is no requirement that it must reside on the message server. The redirection program 45 and the message server 40 are designed to co-operate and interact to allow the pushing of information to mobile devices 100. In this installation, the redirection program 45 takes confidential and non-confidential corporate information for a specific user and redirects it out through the corporate firewall to mobile devices 100. A more detailed description of the redirection software 45 may be found in the commonly assigned U.S. Pat. No. 6,219,694 ("the '694 patent"), entitled "System and Method for Pushing Information From A Host System To A Mobile Data Communication Device Having A Shared Electronic Address", and issued to the assignee of the instant applications on Apr. 17, 2001 which is hereby incorporated into the present application by reference. This push technique may use a wireless friendly encoding, compression and encryption technique to deliver all information to a mobile device, thus effectively extending the security firewall to include each mobile device 100 associated with the host system 30.

As shown in FIG. 2, there may be many alternative paths for getting information to the mobile device 100. One method for loading information onto the mobile device 100 is through a port designated 50, using a device cradle 65. This method tends to be useful for bulk information updates often performed at initialization of a mobile device 100 with the host system 30 or a computer 35 within the system 30. The other main method for data exchange is over-the-air using wireless networks to deliver the information. As shown in FIG. 2, this may be accomplished through a wireless VPN router 75 or through a traditional Internet connection 95 to a wireless gateway 85 and a wireless infrastructure 90, as described above. The concept of a wireless VPN router 75 is new in the wireless industry and implies that a VPN connection could be established directly through a specific wireless network 110 to a mobile device 100. The possibility of using a wireless VPN router 75 has only recently been available and could be used when the new Internet Protocol (IP) Version 6 (IPV6) arrives into IP-based wireless networks. This new protocol will provide enough IP addresses to dedicate an IP address to every mobile device 100 and thus make it possible to push information to a mobile device 100 at any time. A principal advantage of using this wireless VPN router 75 is that it could be an off-the-shelf VPN component, thus it would not require a separate wireless gateway 85 and wireless infrastructure 90 to be used. A VPN connection would preferably be a Transmission Control Protocol (TCP)/IP or User Datagram Protocol (UDP)/IP connection to deliver the messages directly to the mobile device 100. If a wireless VPN 75 is not available then a link 95 to the Internet 20 is the most common connection mechanism available and has been described above.

In the automatic redirection system of FIG. 2, a composed e-mail message 15 leaving the e-mail sender 10 arrives at the message server 40 and is redirected by the redirection program 45 to the mobile device 100. As this redirection takes place the message 15 is re-enveloped, as indicated at 80, and a possibly proprietary compression and encryption algorithm can then be applied to the original message 15. In this way, messages being read on the mobile device 100 are no less secure than if they were read on a desktop workstation such as 35 within the firewall. All messages exchanged between the redirection program 45 and the mobile device 100 preferably use this message repackaging technique. Another goal of this outer envelope is to maintains the addressing information of the original message except the sender's and the receiver's address. This allows reply messages to reach the appropriate destination, and also allows the "from" field to reflect the mobile user's desktop address. Using the user's e-mail address from the mobile device 100 allows the received message to appear as though the message originated from the user's desktop system 35 rather than the mobile device 100.

With reference back to the port 50 and cradle 65 connectivity to the mobile device 100, this connection path offers many advantages for enabling one-time data exchange of large items. For those skilled in the art of personal digital assistants (PDAs) and synchronization, the most common data exchanged over this link is Personal Information Management (PIM) data 55. When exchanged for the first time this data tends to be large in quantity, bulky in nature and requires a large bandwidth to get loaded onto the mobile device 100 where it can be used on the road. This serial link may also be used for other purposes, including setting up a private security key 111 such as an S/MIME or PGP specific private key, the Certificate (Cert) of the user and their Certificate Revocation Lists (CRLs) 60. The private key is preferably exchanged so that the desktop 35 and mobile device 100 share one personality and one method for accessing all mail. The Cert and CRLs are normally exchanged over such a link because they represent a large amount of the data that is required by the device for S/MIME, PGP and other public key security methods.

Figure 3:
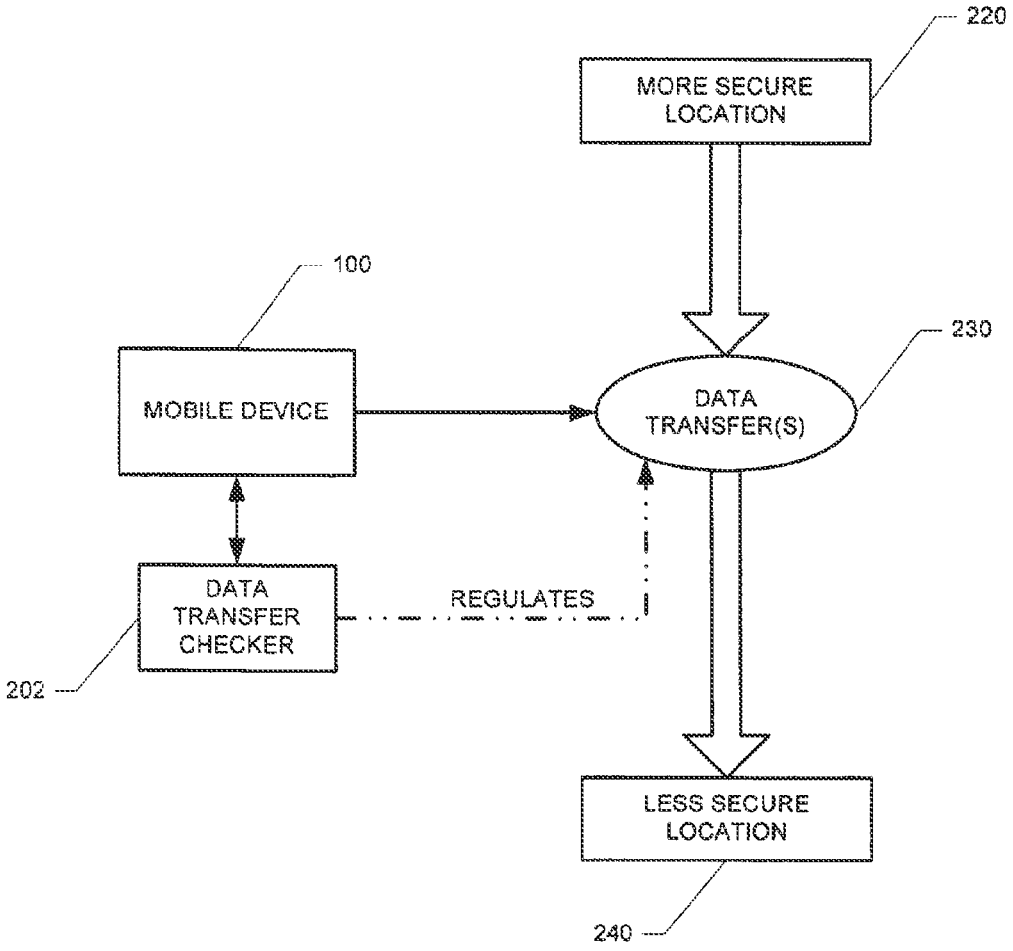
FIGS. 3 and 4 are block diagrams depicting management of data transfers between a secure location and a less secure location.
Figure 4:
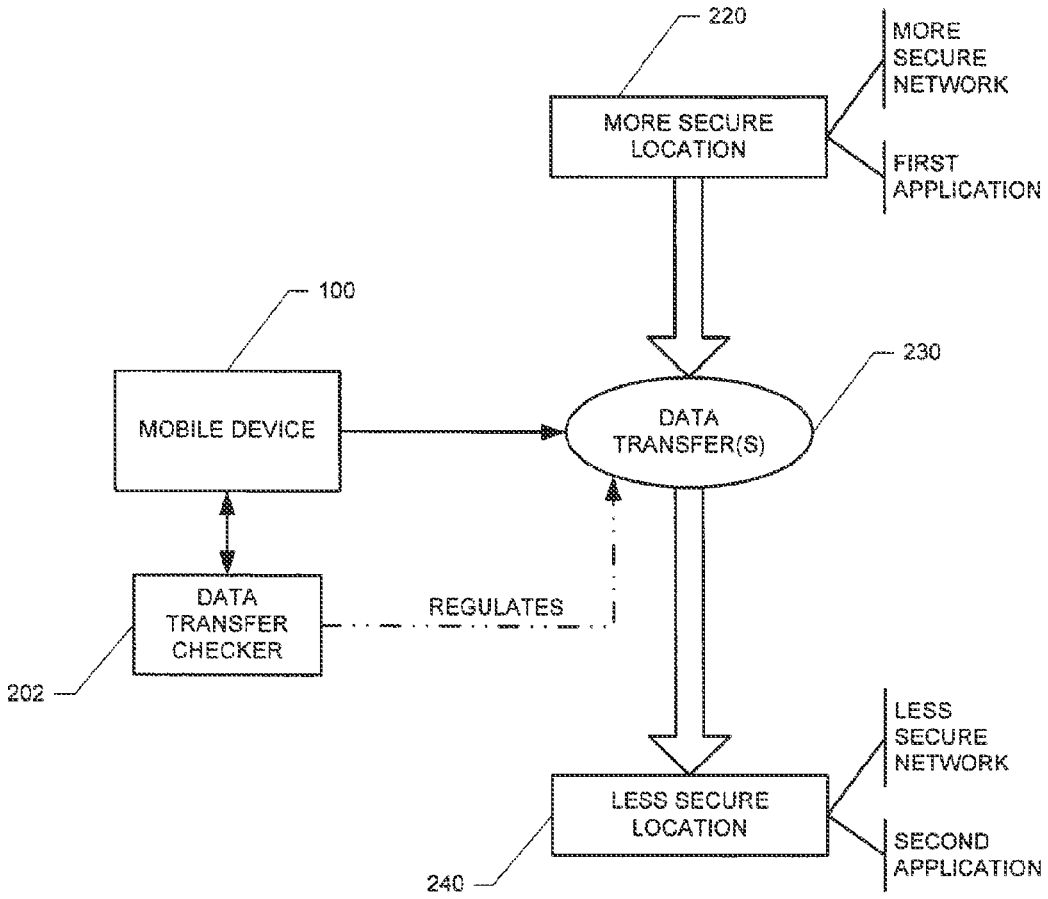

FIG. 3 depicts a system wherein data transfers 230 between a secure location 220 and a less secure location 240 is managed on a mobile device 100 by a data transfer checker 202. A data transfer checker 202 can be implemented on a mobile device 100 as a software routine or in hardware or firmware. FIG. 4 provides several examples of locations 220 and 240. For example, location 220 may be a top-secret or secure network and location 240 may be an unrestricted network.

As another example, location 220 may be a first application that has received sensitive or confidential information. An attempt to transfer data from the first application to a second application may be prevented by the data transfer checker 202 because if the data transfer is successful to the second application, then the second application might be used to disseminate the sensitive data to an unsecured location.

Figure 5:
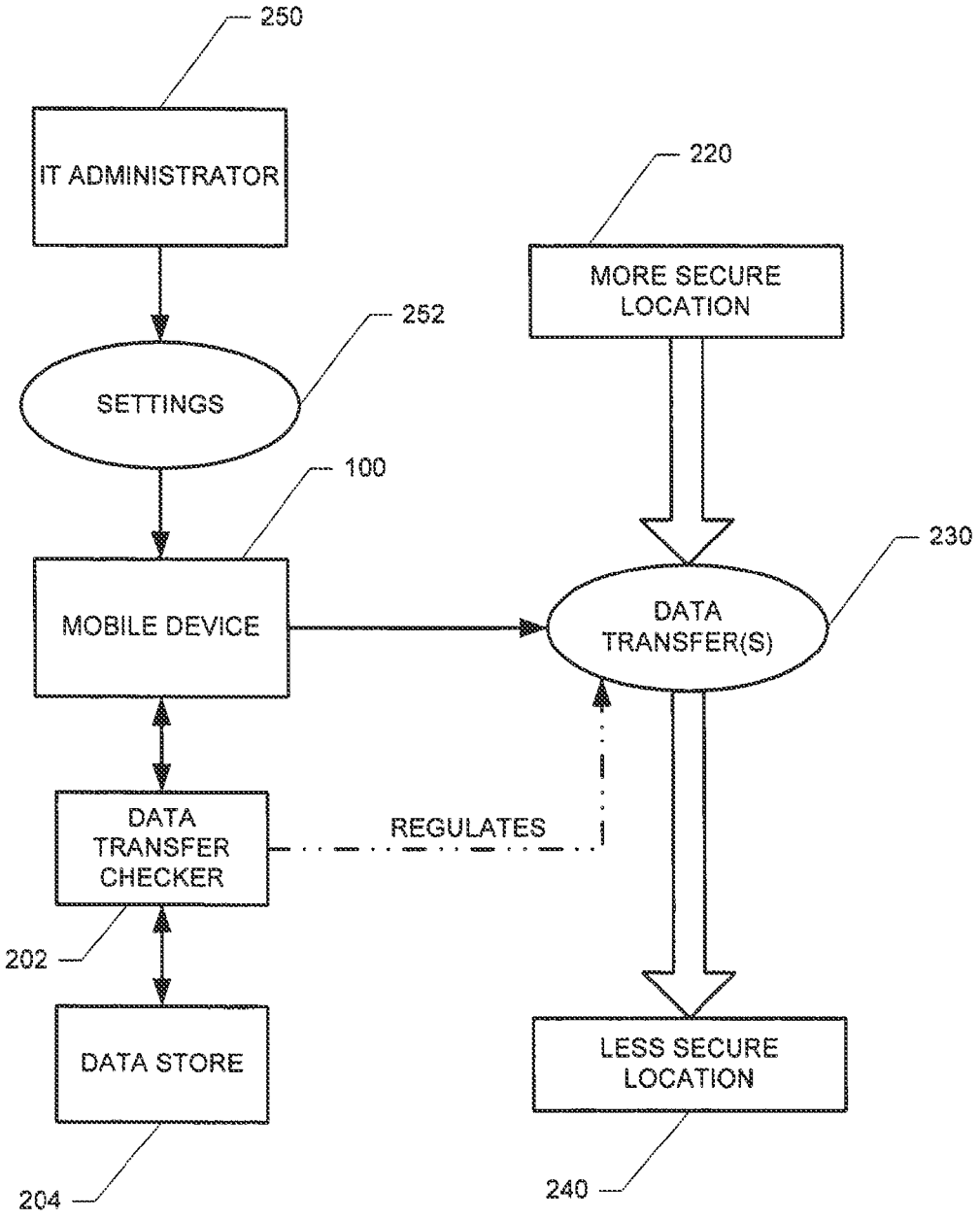
FIG. 5 is a block diagram depicting an IT administrator providing data transfer settings to a mobile device.

FIG. 5 depicts an IT (information technology) administrator 250 (or its agent) providing data transfer criterion or settings 252 to a mobile device 100. The settings 252 can indicate what data transfers 230 are permitted and which ones are not permitted. The settings 252 can be stored in a data store 204 located on the mobile device 100 for access by a data transfer checker 202.

The IT administrator 250 can specify data transfer settings 252 to one or more devices. The settings 252 may be provided to the mobile device 100 over a network (or other data connection mechanism) in order to update the data store 204 on the mobile device 100. The mobile device 100 can be preprogrammed with the settings and can be updated by the IT administrator 250 or can have the initial settings provided by the IT administrator 250.

This provides, among other things, companies with the capability to customize data transfer settings to suit their needs. Also, an IT administrator 250 can provide the same settings to all mobile devices of the company, thereby ensuring that company mobile devices adhere to a consistent IT policy.

An IT policy can be enforced upon mobile devices in many ways, such as through the approaches described in the following commonly assigned United States patent application which is hereby incorporated by reference: "System And Method Of Owner Control Of Electronic Devices" (Ser. No. 10/732,132 filed on Dec. 10, 2003). This document illustrates how a user of the mobile device can be prevented from altering or erasing owner control information (e.g., data transfer settings 252) specified by an IT administrator 250.

Figure 6:
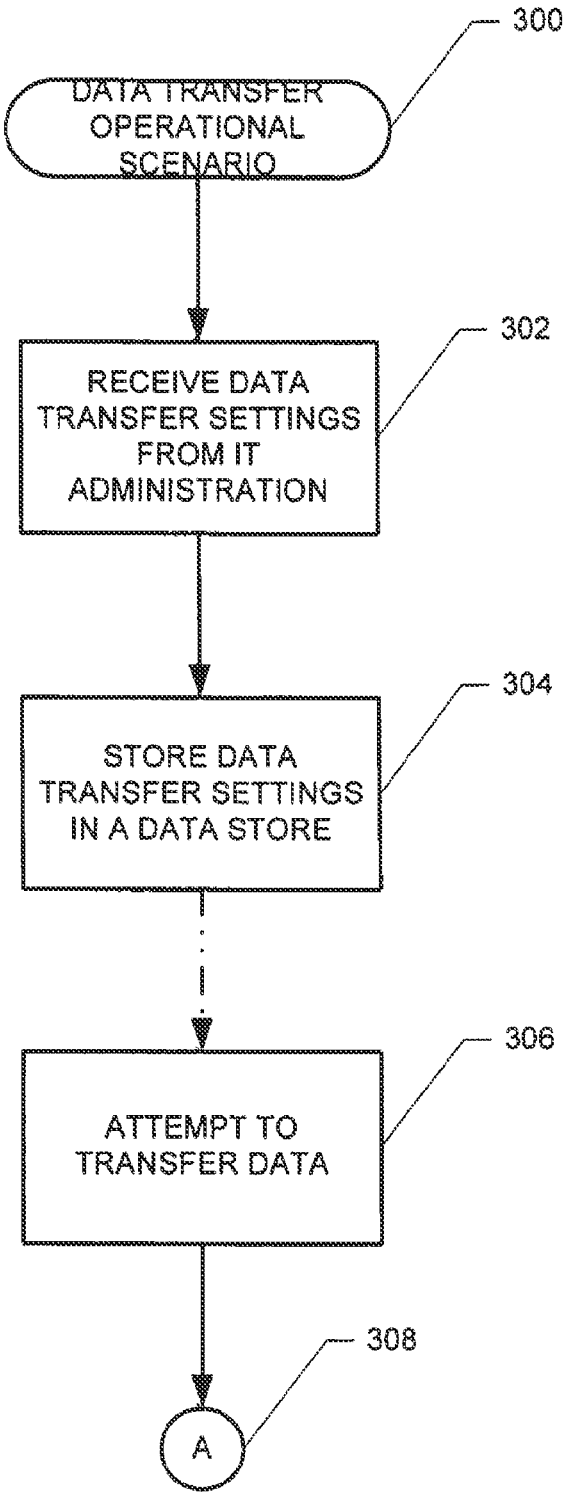
FIGS. 6 and 7 are flowcharts depicting a data transfer operational scenario.
Figure 7:
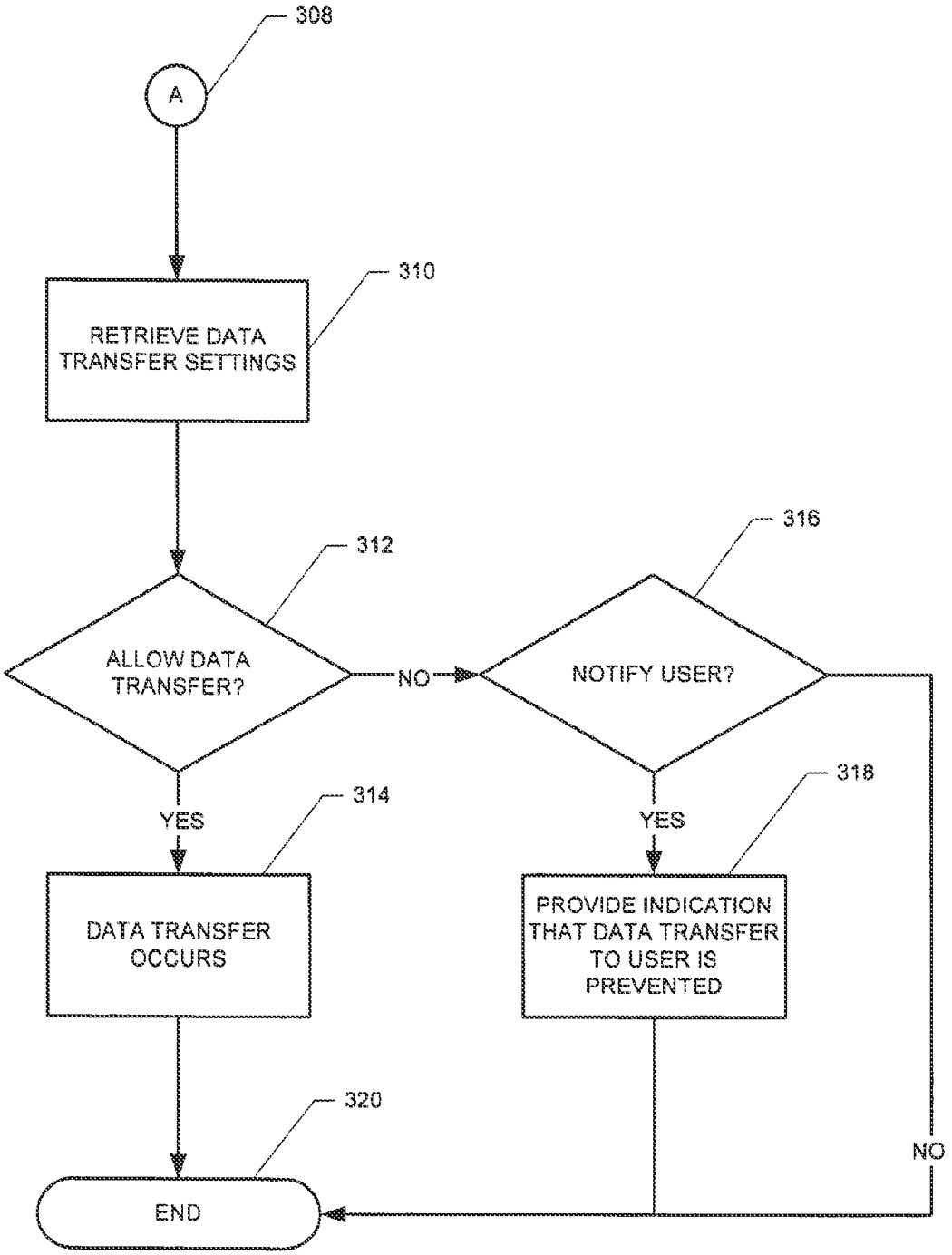

FIGS. 6 and 7 illustrate a data transfer operational scenario 300. At step 302 in the operational scenario, data transfer settings can be provided to one or more mobile devices by IT administration personnel. A company's IT policy can specify that many different data transfer-related features can be enabled/disabled. As an illustration, the data transfer settings can enable/disable such security-related aspects associated with data transfers as the following:

- whether data forwarding between service books should be allowed.
- whether cut/copy/paste operations between applications should be allowed.
- whether applications should be prevented from opening an internal and an external connection.
- whether IPC (interprocess communication) should be allowed between applications.

Using one or more of these features, the company can help ensure that their private data is kept secure. The data transfer settings are stored at step 304 in one or more data stores that are located on the mobile device.

At step 306, there is an attempt in this operational scenario to transfer data from a first location to a second location. Step 310 retrieves the data transfer settings, and decision step 312 examines whether the data transfer should occur in view of the data transfer settings. If the data transfer should occur as determined by decision step 312, then the data transfer occurs between the first location and the second location, and processing for this operational scenario terminates at end block 320.

However, if decision step 312 determines that the data transfer should not be allowed in view of the settings, then decision step 316 determines whether the user should be notified that the data transfer is not permitted. If the user is not to be notified (e.g., because the settings do not allow a feedback message), then processing for this operational scenario terminates at end block 320. However, if the user is to be notified as determined by decision block 316, then an indication is provided at step 318 to the user that the data transfer is being prevented. Processing for this operational scenario terminates at end block 320.

It should be understood that similar to the other processing flows described herein, the steps and the order of the steps in the flowchart described herein may be altered, modified and/or augmented and still achieve the desired outcome.

Figure 8:
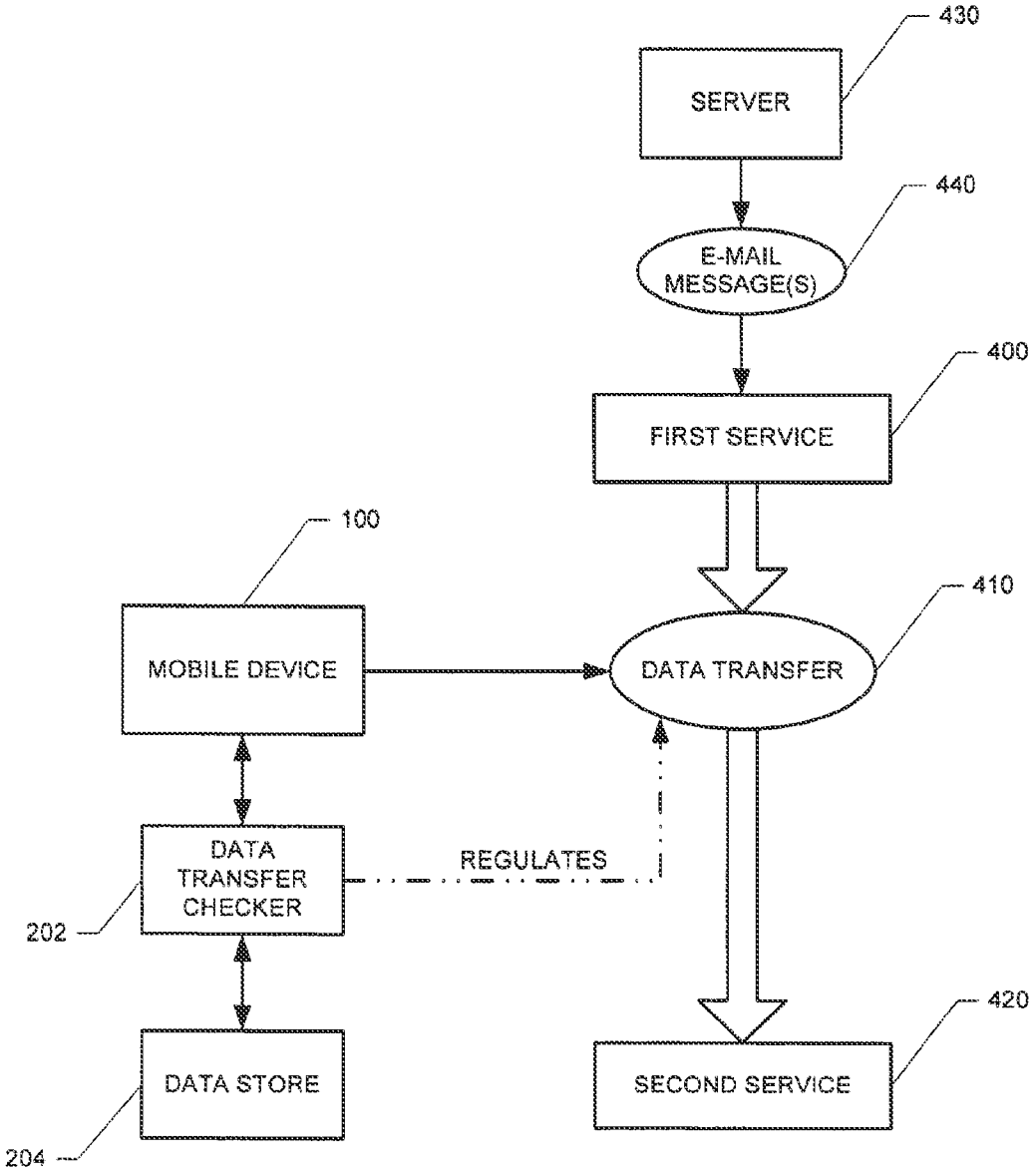
FIG. 8 is a block diagram depicting a data transfer prevention feature wherein data forwarding between service books is prevented.

FIG. 8 illustrates a data transfer prevention feature mentioned above wherein data transfer 410 between services (400, 420) is prevented. Exemplary services comprise a company email service, a user's personal e-mail service, and an instant messaging service. This data transfer prevention feature allows the company to disable improper forwarding/replying between services. For example, if a user receives an email message via a first service 400, the user is unable to forward it to another email account via a second service 420 (such as a personal e-mail account of the user). Optionally, messages 440 that arrive via a source e-mail server 430 must be replied to or forwarded back through the same source e-mail server 430 from which the message 440 arrived.

Figure 9:
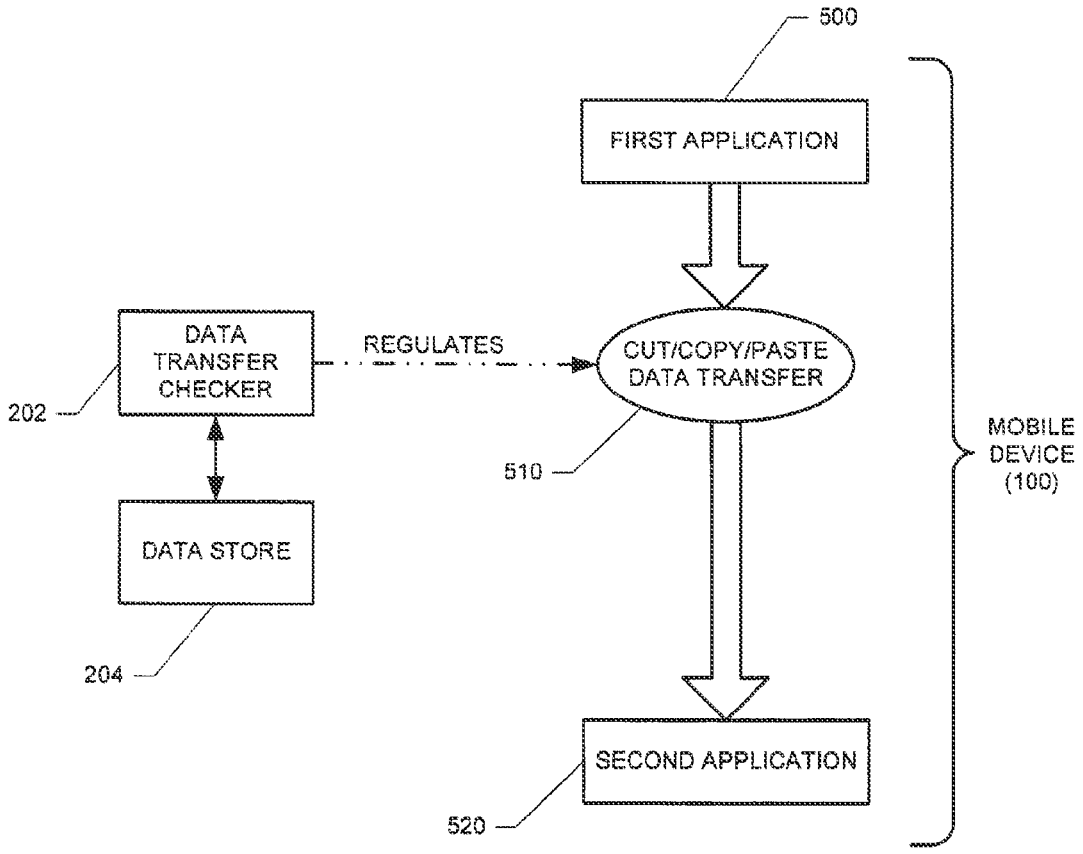
FIG. 9 is a block diagram depicting a data transfer prevention feature wherein cut/copy/paste operations are disabled for applications on a mobile device.

FIG. 9 illustrates a data transfer prevention feature mentioned above wherein cut/copy/paste operations 510 are disabled for all or designated applications on the handheld mobile device 100. As an Illustration, even if the forwarding between applications or services is disabled, a determined user may copy messages from one application 500, compose a new message in a different application 520 and send it through the different application 520. Disabling cut/copy/paste operations makes this much more difficult for the user to siphon data because they would be forced to retype the entire message or data.

Figure 10:
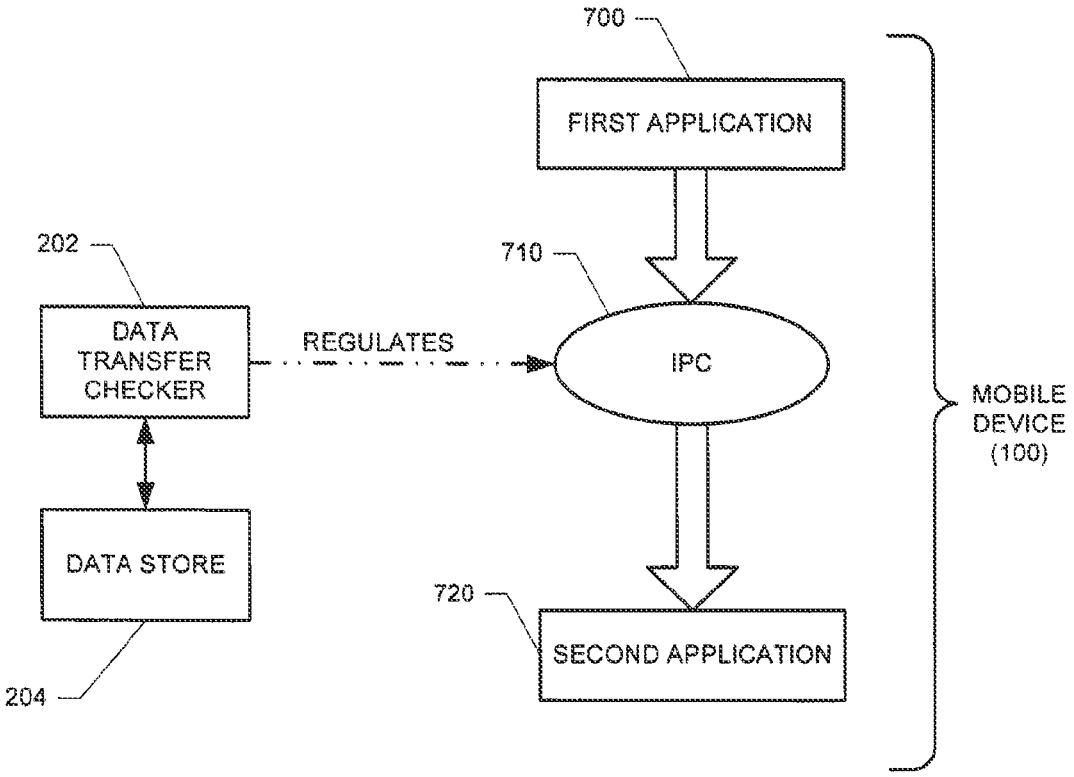
FIG. 10 is a block diagram depicting a data transfer prevention feature wherein Inter-Process Communication (IPC) are disabled between applications operating on a mobile device.

FIG. 10 illustrates a data transfer prevention feature mentioned above wherein Inter-Process Communication (IPC) 710 can be disabled between applications (700, 720) that operate on a mobile device 100. As is known to one skilled in the art, an application may initiate one or more processes in order to accomplish certain tasks on the handheld mobile device 100. This data transfer prevention feature would prevent two malicious applications (700, 720) working together to siphon data. As an example, one application 700 could open up a connection inside the firewall, and another application 720 could open a connection outside the firewall. Then using IPC 710, they could transfer data between the two applications (700, 720) and effectively siphon data. Disabling IPC between the applications (700, 720) prevents this type of attack from occurring.

The data transfer prevention provided by a data transfer checker 202 would inadvertently prohibit IPC between an e-mail program and an address book that are operating on the mobile device 100. Thus, a company can additionally choose which applications are allowed to use IPC, as some applications, such as the e-mail program and the address book, may have a valid use for it.

The systems and methods disclosed herein are presented only by way of example and are not meant to limit the scope of the invention. Other variations of the systems and methods described above will be apparent to those skilled in the art and as such are considered to be within the scope of the invention. For example, a system and method can be configured to include the following. A data transfer checker operating on a mobile device determines whether an attempted data transfer between two locations is permitted. If it is not permitted, then the data transfer is prevented and the user may be notified of the data transfer prevention.

As another example of a system and method, a system and method can receive a data transfer request to transfer data from a first location to a second location, wherein the first location is more secure than the second location. Data transfer settings are retrieved from a data store responsive to receiving the data transfer request. The data transfer settings indicate whether a data transfer is to occur based upon a security-related aspect associated with the data transfer. The data transfer settings are used to determine whether to transfer the data from the first location to the second location based upon the data transfer settings. The data is transferred responsive to the determining step.

A system and method may be configured to consider one or more different data transfer security-related aspects, such as level of security associated with the destination of the data transfer. As other examples, a security related aspect can include the type of communication operation to be performed between the first locations and the second location such as the type of communication to occur. The type of data transfer operation could include data forwarding between service books, opening an internal and an external connection, an Inter-Process Communication (IPC) between applications, and/or a cut-copy-paste type operation between applications.

Figure 11:
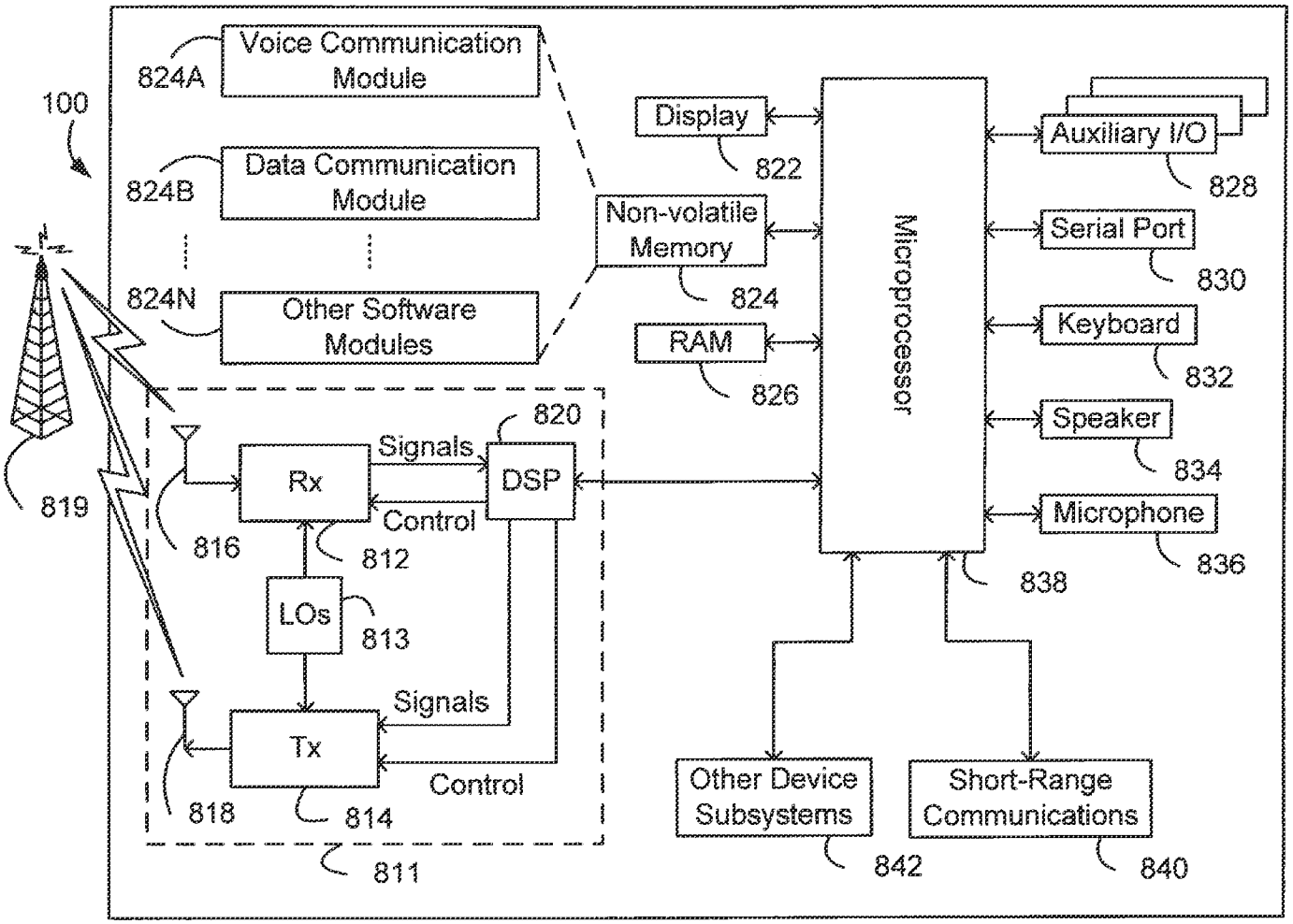
FIG. 11 is a block diagram of an example mobile device.

As another example, the systems and methods disclosed herein may be used with many different computers and devices, such as a wireless mobile communications device shown in FIG. 11. With reference to FIG. 11, the mobile device 100 is a dual-mode mobile device and includes a transceiver 811, a microprocessor 838, a display 822, non-volatile memory 824, random access memory (RAM) 826, one or more auxiliary input/output (I/O) devices 828, a serial port 830, a keyboard 832, a speaker 834, a microphone 836, a short-range wireless communications sub-system 840, and other device sub-systems 842.

The transceiver 811 includes a receiver 812, a transmitter 814, antennas 816 and 818, one or more local oscillators 813, and a digital signal processor (DSP) 820. The antennas 816 and 818 may be antenna elements of a multiple-element antenna, and are preferably embedded antennas. However, the systems and methods described herein are in no way restricted to a particular type of antenna, or even to wireless communication devices.

The mobile device 100 is preferably a two-way communication device having voice and data communication capabilities. Thus, for example, the mobile device 100 may communicate over a voice network, such as any of the analog or digital cellular networks, and may also communicate over a data network. The voice and data networks are depicted in FIG. 11 by the communication tower 819. These voice and data networks may be separate communication networks using separate infrastructure, such as base stations, network controllers, etc., or they may be integrated into a single wireless network.

The transceiver 811 is used to communicate with the network 819, and includes the receiver 812, the transmitter 814, the one or more local oscillators 813 and the DSP 820. The DSP 820 is used to send and receive signals to and from the transceivers 816 and 818, and also provides control information to the receiver 812 and the transmitter 814. If the voice and data communications occur at a single frequency, or closely-spaced sets of frequencies, then a single local oscillator 813 may be used in conjunction with the receiver 812 and the transmitter 814. Alternatively, if different frequencies are utilized for voice communications versus data communications for example, then a plurality of local oscillators 813 can be used to generate a plurality of frequencies corresponding to the voice and data networks 819. Information, which includes both voice and data information, is communicated to and from the transceiver 811 via a link between the DSP 820 and the microprocessor 838.

The detailed design of the transceiver 811, such as frequency band, component selection, power level, etc., will be dependent upon the communication network 819 in which the mobile device 100 is intended to operate. For example, a mobile device 100 intended to operate in a North American market may include a transceiver 811 designed to operate with any of a variety of voice communication networks, such as the Mobitex or DataTAC mobile data communication networks, AMPS, TDMA, CDMA, PCS, etc., whereas a mobile device 100 intended for use in Europe may be configured to operate with the GPRS data communication network and the GSM voice communication network. Other types of data and voice networks, both separate and integrated, may also be utilized with a mobile device 100.

Depending upon the type of network or networks 819, the access requirements for the mobile device 100 may also vary. For example, in the Mobitex and DataTAC data networks, mobile devices are registered on the network using a unique identification number associated with each mobile device. In GPRS data networks, however, network access is associated with a subscriber or user of a mobile device. A GPRS device typically requires a subscriber identity module ("SIM"), which is required in order to operate a mobile device on a GPRS network. Local or non-network communication functions (if any) may be operable, without the SIM device, but a mobile device will be unable to carry out any functions involving communications over the data network 819, other than any legally required operations, such as '911' emergency calling.

After any required network registration or activation procedures have been completed, the mobile device 100 may the send and receive communication signals, including both voice and data signals, over the networks 819. Signals received by the antenna 816 from the communication network 819 are routed to the receiver 812, which provides for signal amplification, frequency down conversion, filtering, channel selection, etc., and may also provide analog to digital conversion. Analog to digital conversion of the received signal allows more complex communication functions, such as digital demodulation and decoding to be performed using the DSP 820. In a similar manner, signals to be transmitted to the network 819 are processed, including modulation and encoding, for example, by the DSP 820 and are then provided to the transmitter 814 for digital to analog conversion, frequency up conversion, filtering, amplification and transmission to the communication network 819 via the antenna 818.

In addition to processing the communication signals, the DSP 820 also provides for transceiver control. For example, the gain levels applied to communication signals in the receiver 812 and the transmitter 814 may be adaptively controlled through automatic gain control algorithms implemented in the DSP 820. Other transceiver control algorithms could also be implemented in the DSP 820 in order to provide more sophisticated control of the transceiver 811.

The microprocessor 838 preferably manages and controls the overall operation of the mobile device 100. Many types of microprocessors or microcontrollers could be used here, or, alternatively, a single DSP 820 could be used to carry out the functions of the microprocessor 838. Low-level communication functions, including at least data and voice communications, are performed through the DSP 820 in the transceiver 811. Other, high-level communication applications, such as a voice communication application 824A, and a data communication application 824B may be stored in the non-volatile memory 824 for execution by the microprocessor 838. For example, the voice communication module 824A may provide a high-level user interface operable to transmit and receive voice calls between the mobile device 100 and a plurality of other voice or dual-mode devices via the network 819. Similarly, the data communication module 824B may provide a high-level user interface operable for sending and receiving data, such as e-mail messages, files, organizer information, short text messages, etc., between the mobile device 100 and a plurality of other data devices via the networks 819.

The microprocessor 838 also interacts with other device subsystems, such as the display 822, the RAM 826, the auxiliary input/output (I/O) subsystems 828, the serial port 830, the keyboard 832, the speaker 834, the microphone 836, the short-range communications subsystem 840 and any other device subsystems generally designated as 842.

Some of the subsystems shown in FIG. 11 perform communication-related functions, whereas other subsystems may provide "resident" or on-device functions. Notably, some subsystems, such as the keyboard 832 and the display 822 may be used for both communication-related functions, such as entering a text message for transmission over a data communication network, and device-resident functions such as a calculator or task list or other PDA type functions.

Operating system software used by the microprocessor 838 is preferably stored in a persistent store such as non-volatile memory 824. The non-volatile memory 824 may be implemented, for example, as a Flash memory component, or as battery hacked-up RAM. in addition to the operating system, which controls low-level functions of the mobile device 810, the non-volatile memory 824 includes a plurality of software modules 824A-824N that can be executed by the microprocessor 838 (and/or the DSP 820), including a voice communication module 824A, a data communication module 824B, and a plurality of other operational modules 824N for carrying out a plurality of other functions. These modules are executed by the microprocessor 838 and provide a high-level interface between a user and the mobile device 100. This interface typically includes a graphical component provided through the display 822, and an input/output component provided through the auxiliary I/O 828, keyboard 832, speaker 834, and microphone 836. The operating system, specific device applications or modules, or parts thereof, may be temporarily loaded into a volatile store, such as RAM 826 for faster operation. Moreover, received communication signals may also be temporarily stored to RAM 826, before permanently writing them to a file system located in a persistent store such as the Flash memory 824.

An exemplary application module 824N that may be loaded onto the mobile device 100 is a personal information manager (PIM) application providing PDA functionality, such as calendar events, appointments, and task items. This module 824N may also interact with the voice communication module 824A for managing phone calls, voice mails, etc., and may also interact with the data communication module for managing e-mail communications and other data transmissions. Alternatively, all of the functionality of the voice communication module 824A and the data communication module 824B may be integrated into the PIM module.

The non-volatile memory 824 preferably also provides a file system to facilitate storage of PIM data items on the device. The PIM application preferably includes the ability to send and receive data items, either by itself, or in conjunction with the voice and data communication modules 824A, 824B, via the wireless networks 819. The PIM data items are preferably seamlessly integrated, synchronized and updated, via the wireless networks 819, with a corresponding set of data items stored or associated with a host computer system, thereby creating a mirrored system for data items associated with a particular user.

Context objects representing at least partially decoded data items, as well as fully decoded data items, are preferably stored on the mobile device 100 in a volatile and non-persistent store such as the RAM 826. Such information may instead be stored in the non-volatile memory 824, for example, when storage intervals are relatively short, such that the information is removed from memory soon after it is stored. However, storage of this information in the RAM 826 or another volatile and non-persistent store is preferred, in order to ensure that the information is erased from memory when the mobile device 100 loses power. This prevents an unauthorized party from obtaining any stored decoded or partially decoded information by removing a memory chip from the mobile device 100, for example.

The mobile device 100 may be manually synchronized with a host system by placing the device 100 in an interface cradle, which couples the serial port 830 of the mobile device 100 to the serial port of a computer system or device. The serial port 830 may also be used to enable a user to set preferences through an external device or software application, or to download other application modules 824N for installation. This wired download path may be used to load an encryption key onto the device, which is a more secure method than exchanging encryption information via the wireless network 819. Interfaces for other wired download paths may be provided in the mobile device 100, in addition to or instead of the serial port 830. For example, a USB port would provide an interface to a similarly equipped personal computer.

Additional application modules 824N may be loaded onto the mobile device 100 through the networks 819, through an auxiliary I/O subsystem 828, through the serial port 830, through the short-range communications subsystem 840, or through any other suitable subsystem 842, and installed by a user in the non-volatile memory 824 or RAM 826. Such flexibility in application installation increases the functionality of the mobile device 100 and may provide enhanced on-device functions, communication-related functions, or both. For example, secure communication applications may enable electronic commerce functions and other such financial transactions to be performed using the mobile device 100.

When the mobile device 100 is operating in a data communication mode, a received signal, such as a text message or a web page download, is processed by the transceiver module 811 and provided to the microprocessor 838, which preferably further processes the received signal in multiple stages as described above, for eventual output to the display 822, or, alternatively, to an auxiliary I/O device 828. A user of mobile device 100 may also compose data items, such as e-mail messages, using the keyboard 832, which is preferably a complete alphanumeric keyboard laid out in the QWERTY style, although other styles of complete alphanumeric keyboards such as the known DVORAK style may also be used. User input to the mobile device 100 is further enhanced with a plurality of auxiliary I/O devices 828, which may include a thumbwheel input device, a touchpad, a variety of switches, a rocker input switch, etc. The composed data items input by the user may then be transmitted over the communication networks 819 via the transceiver module 811.

When the mobile device 100 is operating in a voice communication mode, the overall operation of the mobile device is substantially similar to the data mode, except that received signals are preferably be output to the speaker 834 and voice signals for transmission are generated by a microphone 836. Alternative voice or audio I/O subsystems, such as a voice message recording subsystem, may also be implemented on the mobile device 100. Although voice or audio signal output is preferably accomplished primarily through the speaker 834, the display 822 may also be used to provide an indication of the identity of a calling party, the duration of a voice call, or other voice call related information. For example, the microprocessor 838, in conjunction with the voice communication module and the operating system software, may detect the caller identification information of an incoming voice call and display it on the display 822.

A short-range communications subsystem 840 is also included in the mobile device 100. The subsystem 840 may include an infrared device and associated circuits and components, or a short-range RF communication module such as a Bluetooth™ module or an 802.11 module, for example, to provide for communication with similarly-enabled systems and devices. Those skilled in the art will appreciate that "Bluetooth" and "802.11" refer to sets of specifications, available from the Institute of Electrical and Electronics Engineers, relating to wireless personal area networks and wireless local area networks, respectively.

The systems' and methods' data may be stored in one or more data stores. The data stores can be of many different types of storage devices and programming constructs, such as RAM, ROM, Flash memory, programming data structures, programming variables, etc. It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions for use in execution by a processor to perform the methods' operations and implement the systems described herein.

The computer components, software modules, functions and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computing device or distributed across multiple computing devices depending upon the situation at hand.

What is claimed is:

[1. A method of handling data transfers on a device, comprising:

receiving, from an application that accesses data associated with a first location, a request to open a connection with a second location;

retrieving, from a data store on the device, one or more data transfer settings responsive to receiving the request;

wherein the one or more data transfer settings are indicative of a security-related policy for data transfers associated with the first location; and determining whether to permit the request or not permit the request based upon the one or more data transfer settings.]

[2. The method of claim 1, wherein the first location comprises a server, wherein the second location comprises a server, and wherein the request is to open the connection via a network.]

[3. The method of claim 1, wherein the application is a first application, wherein the second location comprises a second application, wherein the request is to open the connection for Inter-Process Communication (IPC) from the first application to the second application.]

[4. The method of claim 1, wherein the determining comprises using a level of security associated with the first location, and using a level of security associated with the second location.]

[5. The method of claim 1, wherein receiving the request comprises receiving a request to transfer data from the application running on the device to another application on the device to another device.]

[6. The method of claim 1, wherein receiving the request comprises receiving a request to transfer data from the device to another device.]

[7. The method of claim 1, further comprising:

receiving the one or more data transfer settings from a server via a wireless network.]

[8. A device, comprising:

a data store that stores a data transfer setting, wherein the data transfer setting is indicative of a security-related policy for data transfers associated with a first location; and;

a processor configured to performs operations comprising:

receiving, from an application that accesses data associated with the first location, a request to open a connection with a second location;

retrieving, from the data store, the data transfer setting responsive to receiving the request; and determining whether to permit the request or not permit the request based upon the data transfer setting.]

[9. The device of claim 8, wherein the first location comprises a server, wherein the second location comprises a server, and wherein the request is to open the connection via a network.]

[10. The device of claim 8, wherein the application is a first application, wherein the second location comprises a second application, wherein the request is to open the connection for Inter-Process Communication (IPC) from the first application to the second application.]

[11. The device of claim 8, wherein the determining comprises using a level of security associated with the first location, and using a level of security associated with the second location.]

[12. The device of claim 8, wherein receiving the request comprises receiving a request to transfer data from the application running on the device to another application on the device.]

[13. The device of claim 8, wherein receiving the request comprises receiving a request to transfer data from the device to another device.]

[14. The device of claim 8, the operations further comprising:

receiving the data transfer setting from a server via a wireless network; and storing the data transfer setting in the data store.]

[15. A computer storage device encoded with a computer program, the program comprising instructions that when executed by a communication device cause the communication device to perform operations comprising:

receiving, from an application that accesses data associated with a first location, a request to open a connection with a second location;

retrieving, in response to receiving the request, once or more data transfer settings, which are indicative of a security-related policy for data transfers associated with the first location; and determining whether to permit the request or not permit the request based upon the one or more data transfer settings.]

[16. The computer storage device of claim 15, wherein the first location comprises a server, wherein the second location comprises a server, and wherein the request is to open the connection via a network.]

[17. The computer storage device of claim 15, wherein the application is a first application, wherein the second location comprises a second application, wherein the request is to open the connection for Inter-Process Communication (IPC) from the first application to the second application.]

[18. The computer storage device of claim 15, wherein the determining comprises using a level of security associated with the first location, and using a level of security associated with the second location.]

[19. The computer storage device of claim 15, wherein receiving the request comprises receiving a request to transfer data from the application running on the communication device to another application on the communication device.]

[20. The computer storage device of claim 15, wherein receiving the request comprises receiving a request to transfer data from the communication device to another communication device.]

[21. The computer storage device of claim 15, the operations further comprising:

receiving the one or more data transfer settings from a server via a wireless network.]

*22. A method of handling data transfers on a device, comprising:*

*receiving a request to transfer data from a first application on the device to a second application on the device, the first application capable of accessing data associated with a first network and the second application capable of accessing data associated with a second network;*

*determining that the requested data transfer from the first application to the second application violates a security-related policy associated with the first application; and*

*prohibiting the requested data transfer in response to the determining.*

*23. The method of claim 22, wherein the first network has a first security level higher than a second security level of the second network.*

*24. The method of claim 22, wherein the data transfer includes pasting data cut or copied from the first application to the second application or communicating using Inter-Process Communication (IPC) between the first application and the second application.*

*25. The method of claim 22, wherein prohibiting the data transfer comprises preventing the first application from establishing a connection with the first network while the second application is connected with the second network or preventing transfer of the data between a first service book associated with the first application and a second service book associated with the second application.*

*26. The method of claim 22, wherein the determining is based on a level of security associated with the first application and a level of security associated with the second application.*

*27. A device, comprising:*

*one or more processors configured to:*

*receive a request to transfer data from a first application on the device to a second application on the device, the first application capable of accessing data associated with a first network and the second application capable of accessing data associated with a second network;*

*determine that the requested data transfer from the first application to the second application violates a security-related policy associated with the first application; and*

*prohibit the requested data transfer in response to the determination that the requested data transfer violates the security-related policy.*

*28. The device of claim 27, wherein the first network has a first security level higher than a second security level of the second network.*

*29. The device of claim 27, wherein the data transfer includes pasting data cut or copied from the first application to the second application or communicating using Inter-Process Communication (IPC) between the first application and the second application.*

*30. The device of claim 27, wherein the one or more processors configured to prohibit the data transfer comprises the*

*one or more processors configured to prevent the first application from establishing a connection with the first network while the second application is connected with the second network or prevent transfer of the data between a first service book associated with the first application and a second service book associated with the second application.*

*31. The device of claim 27, wherein the determination is based on a level of security associated with the first application and a level of security associated with the second application.*

*32. A computer program product encoded on a non-transitory medium, the product comprising computer readable instructions for causing one or more processors to perform operations comprising:*

*receiving a request to transfer data from a first application on the device to a second application on the device, the first application capable of accessing data associated with a first network and the second application capable of accessing data associated with a second network;*

*determining that the requested data transfer from the first application to the second application violates a security-related policy associated with the first application; and*

*prohibiting the requested data transfer in response to the determining.*

*33. The computer program product of claim 32, wherein the first network has a first security level higher than a second security level of the second network.*

*34. The computer program product of claim 32, wherein the data transfer includes pasting data cut or copied from the first application to the second application or communicating using Inter-Process Communication (IPC) between the first application and the second application.*

*35. The computer program product of claim 32, wherein the prohibiting the data transfer comprises preventing the first application from establishing a connection with the first network while the second application is connected with the second network or preventing transfer of the data between a first service book associated with the first application and a second service book associated with the second application.*

*36. The computer program product of claim 32, wherein the determining is based on a level of security associated with the first application and a level of security associated with the second application.*

* * * * *